(12) United States Patent
Singh et al.

(10) Patent No.: US 7,058,239 B2
(45) Date of Patent: Jun. 6, 2006

(54) SYSTEM AND METHOD FOR PANORAMIC IMAGING

(75) Inventors: Sanjiv Singh, Pittsburgh, PA (US); Michael Rondinelli, Bethel Park, PA (US); Herman Herman, Pittsburgh, PA (US)

(73) Assignee: EyeSee360, Inc., Pittsburgh, PA (US)

( * ) Notice: Subject to any disclaimer, the term of this patent is extended or adjusted under 35 U.S.C. 154(b) by 768 days.

(21) Appl. No.: 10/282,187

(22) Filed: Oct. 28, 2002

(65) Prior Publication Data

US 2003/0095338 A1 May 22, 2003

Related U.S. Application Data

(63) Continuation-in-part of application No. 10/256,743, filed on Sep. 26, 2002.

(60) Provisional application No. 60/346,717, filed on Jan. 7, 2002, provisional application No. 60/348,471, filed on Oct. 29, 2001.

(51) Int. Cl.
*G06K 9/36* (2006.01)

(52) U.S. Cl. .................. 382/284; 382/282; 382/294; 348/36; 348/37

(58) Field of Classification Search .............. 382/282, 382/284, 294; 348/36, 37, 50
See application file for complete search history.

(56) References Cited

U.S. PATENT DOCUMENTS

| 994,935 | A | 6/1911 | Kleinschmidt |
|---|---|---|---|
| 3,846,809 | A | 11/1974 | Pinzone et al. |
| 4,429,957 | A | 2/1984 | King |
| 4,549,208 | A | 10/1985 | Kamejima et al. |
| 4,734,690 | A | 3/1988 | Waller |
| 4,757,383 | A | 7/1988 | Tanaka |
| 4,797,944 | A | 1/1989 | Tanaka |

(Continued)

FOREIGN PATENT DOCUMENTS

FR 1234341 10/1960

OTHER PUBLICATIONS

R. A. Hicks et al., "Catadioptric Sensors That Approximate Wide-Angle Perspective Projections," Drexel University and National Science Foundation, pp. 1-7.

(Continued)

*Primary Examiner*—Samir Ahmed
*Assistant Examiner*—Yosef Kassa
(74) *Attorney, Agent, or Firm*—Lara A. Northrop, Esq.; Pietragallo, Bosick & Gordon LLP

(57) ABSTRACT

The present invention provides a system for processing panoramic photographic images. The system includes a mirror for reflecting an image of a scene, a mounting assembly for mounting the mirror on an axis, a first camera for capturing the image reflected by the mirror, at least one secondary camera for capturing a portion of the scene, means for mapping pixel data of the image captured by the first camera into a viewable image, and means for cooperatively displaying the viewable image and the portion of the scene captured by the at least one of the secondary cameras. The mirror may include a convex reflective surface defined by rotating around the axis: an equi-angular shape or a compensated equi-angular shape. The secondary camera may also capture a portion of the image reflected by the mirror. Alternatively, the system may include a single camera including an active-pixel image sensor for capturing at least a portion of the image reflected by the mirror. Methods for processing images in accordance with the system are also provided.

97 Claims, 19 Drawing Sheets

U.S. PATENT DOCUMENTS

| | | | |
|---|---|---|---|
| 4,805,030 A | 2/1989 | Tanaka |
| 4,807,042 A | 2/1989 | Tanaka |
| 4,965,753 A | 10/1990 | Kraemer |
| D312,263 S | 11/1990 | Charles |
| 5,067,019 A | 11/1991 | Juday et al. |
| 5,115,266 A | 5/1992 | Troje |
| 5,175,808 A | 12/1992 | Sayre |
| 5,185,667 A | 2/1993 | Zimmermann |
| 5,187,571 A | 2/1993 | Braun et al. |
| 5,359,363 A | 10/1994 | Kuban et al. |
| 5,396,583 A | 3/1995 | Chen et al. |
| 5,434,617 A | 7/1995 | Bianchi |
| 5,444,478 A | 8/1995 | Lelong et al. |
| 5,452,413 A | 9/1995 | Blades |
| 5,574,836 A | 11/1996 | Broemmelsiek |
| 5,586,231 A | 12/1996 | Florent et al. |
| 5,594,845 A | 1/1997 | Florent et al. |
| 5,640,496 A | 6/1997 | Hardy et al. |
| 5,657,073 A | 8/1997 | Henley |
| 5,790,181 A | 8/1998 | Chahl et al. |
| 5,796,426 A | 8/1998 | Gullichsen et al. |
| RE36,207 E | 5/1999 | Zimmermann et al. |
| 5,920,376 A * | 7/1999 | Bruckstein et al. ............ 352/69 |
| 5,963,213 A | 10/1999 | Guedalia et al. |
| 5,990,941 A | 11/1999 | Jackson et al. |
| 6,005,611 A | 12/1999 | Gullichsen et al. |
| 6,043,837 A | 3/2000 | Driscoll, Jr. et al. |
| 6,118,474 A | 9/2000 | Nayar |
| 6,157,018 A | 12/2000 | Ishiguro et al. |
| 6,157,385 A | 12/2000 | Oxaal |
| 6,175,454 B1 | 1/2001 | Hoogland et al. |
| 6,204,855 B1 | 3/2001 | Khaund |
| 6,211,864 B1 | 4/2001 | Redford |
| 6,215,519 B1 | 4/2001 | Nayar et al. |
| 6,219,089 B1 | 4/2001 | Driscoll, Jr. et al. |
| 6,222,683 B1 | 4/2001 | Hoogland et al. |
| 6,226,035 B1 | 5/2001 | Korein et al. |
| 6,233,004 B1 | 5/2001 | Tanaka et al. |
| 6,246,413 B1 | 6/2001 | Teo |
| 6,256,061 B1 | 7/2001 | Martin et al. |
| 6,271,855 B1 | 8/2001 | Shum et al. |
| 6,304,285 B1 | 10/2001 | Geng |
| 6,313,865 B1 * | 11/2001 | Driscoll et al. ............... 348/36 |
| 6,320,584 B1 | 11/2001 | Golin et al. |
| 6,323,862 B1 | 11/2001 | Oxaal |
| 6,331,869 B1 | 12/2001 | Furlan et al. |
| 6,333,826 B1 | 12/2001 | Charles |
| 6,337,708 B1 | 1/2002 | Furlan et al. |
| 6,369,818 B1 | 4/2002 | Hoffman et al. |
| 6,791,598 B1 * | 9/2004 | Luken et al. ................. 348/36 |
| 2001/0010555 A1 | 8/2001 | Driscoll, Jr. |
| 2001/0015751 A1 | 8/2001 | Geng |
| 2002/0006000 A1 | 1/2002 | Kumata et al. |
| 2002/0041326 A1 | 4/2002 | Driscoll et al. |
| 2002/0064306 A1 | 5/2002 | Pilz |

OTHER PUBLICATIONS

J. S. Chahl et al., "Reflective Surfaces for Panoramic Imaging," *Applied Optics*, vol. 36, No. 31, Nov. 1, 1997, pp. 8275-8285.

M. Ollis et al., "Analysis and Design of Panoramic Stereo Vision Using Equi-Angular Pixel Cameras," The Robotics Institute, Carnegie Mellon University, CMU-RI-TR-99-04, Jan. 1999, pp. 1-43.

* cited by examiner

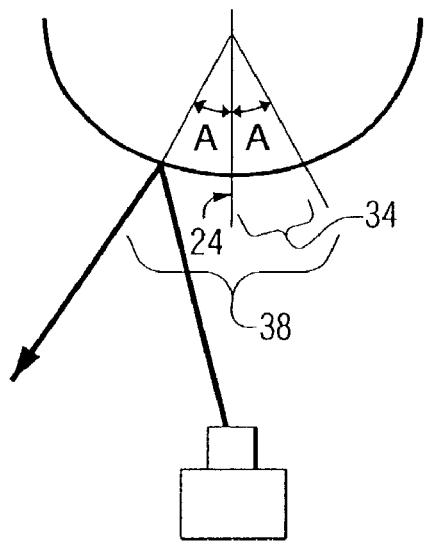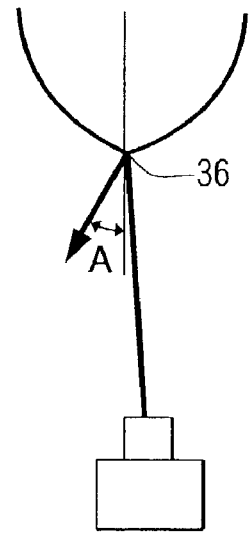
FIG. 8A  FIG. 8B
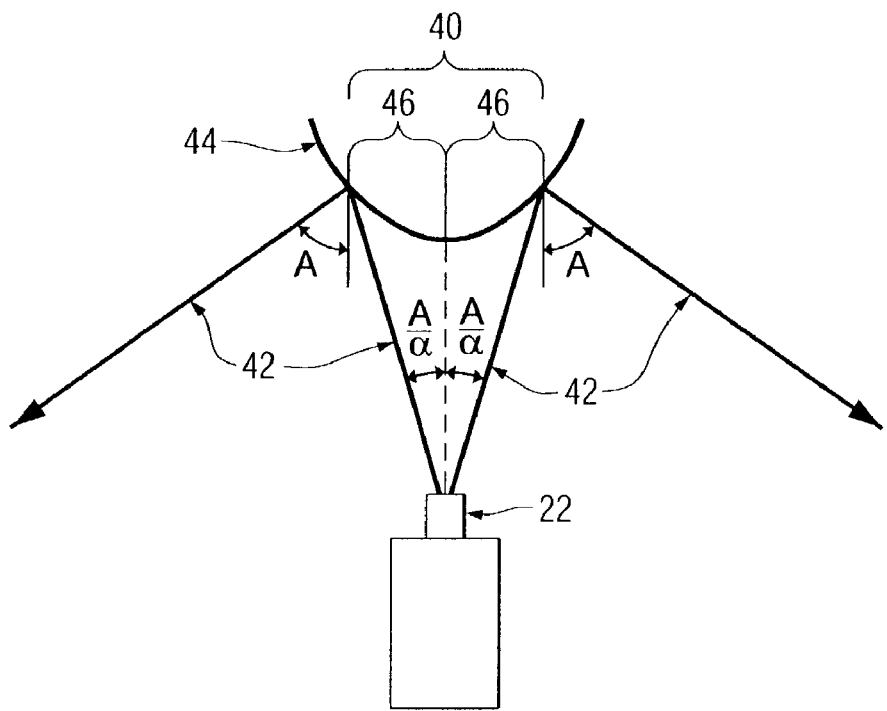
FIG. 9

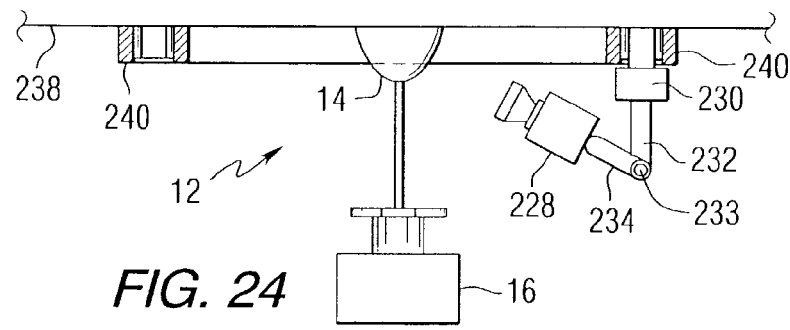
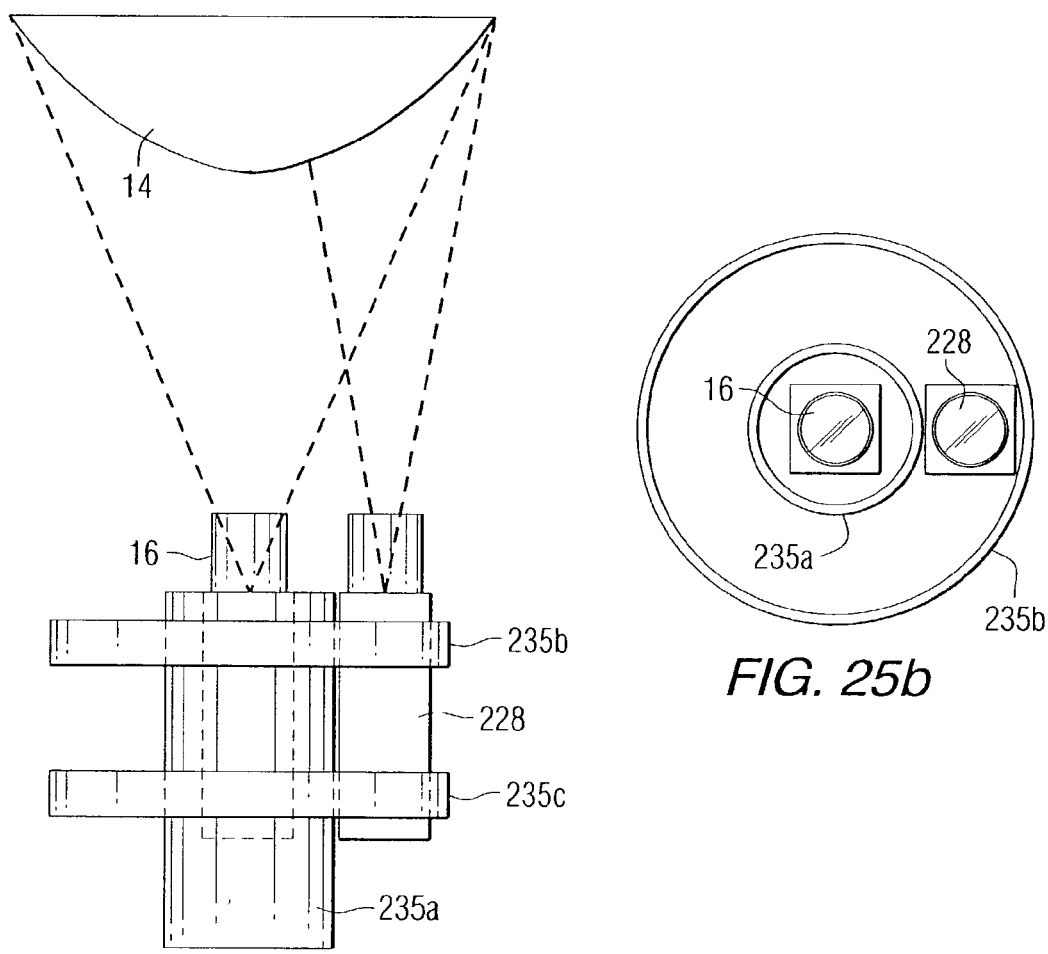
FIG. 24
FIG. 25b
FIG. 25a

SYSTEM AND METHOD FOR PANORAMIC IMAGING

CROSS-REFERENCE TO RELATED APPLICATIONS

This application is a continuation-in-part of U.S. patent application Ser. No. 10/256,743 filed Sep. 26, 2002. This application also claims the benefit of U.S. Provisional Application Ser. No. 60/348,471 filed Oct. 29, 2001 and U.S. Provisional Application Ser. No. 60/346,717 filed Jan. 7, 2002.

FIELD OF THE INVENTION

The present invention relates to panoramic imaging, and more particularly relates to a system for processing panoramic photographic images.

BACKGROUND INFORMATION

Recent work has shown the benefits of panoramic imaging, which is able to capture a large azimuth view with a significant elevation angle. If instead of providing a small conic section of a view, a camera could capture an entire half-sphere or more at once, several advantages could be realized. Specifically, if the entire environment is visible at the same time, it is not necessary to move the camera to fixate on an object of interest or to perform exploratory camera movements. Additionally, this means that it is not necessary to stitch multiple, individual images together to form a panoramic image. This also means that the same panoramic image or panoramic video can be supplied to multiple viewers, and each viewer can view a different portion of the image or video, independent from the other viewers.

One method for capturing a large field of view in a single image is to use an ultra-wide-angle lens. A drawback to this is the fact that a typical 180-degree lens can cause substantial amounts of optical distortion in the resulting image.

A video or still camera placed below a convex reflective surface can provide a large field of view provided an appropriate mirror shape is used. Such a configuration is suited to miniaturization and can be produced relatively inexpensively. Spherical mirrors have been used in such panoramic imaging systems. Spherical mirrors have constant curvatures and are easy to manufacture, but do not provide optimal imaging or resolution.

Hyperboloidal mirrors have been proposed for use in panoramic imaging systems. The rays of light which are reflected off of the hyperboloidal surface, no matter where the point of origin, all converge at a single point, enabling perspective viewing. A major drawback to this system lies in the fact that the rays of light that make up the reflected image converge at the focal point of the reflector. As a result, positioning of the sensor relative to the reflecting surface is critical, and even a slight disturbance of the mirror will impair the quality of the image. Another disadvantage is that the use of a perspective-projections model inherently requires that, as the distance between the sensor and the mirror increases, the cross-section of the mirror must increase. Therefore, in order to keep the mirror at a reasonable size, the mirror must be placed close to the sensor. This causes complications to arise with respect to the design of the image sensor optics.

Another proposed panoramic imaging system uses a parabolic mirror and an orthographic lens for producing perspective images. A disadvantage of this system is that many of the light rays are not orthographically reflected by the parabolic mirror. Therefore, the system requires an orthographic lens to be used with the parabolic mirror.

The use of equi-angular mirrors has been proposed for panoramic imaging systems. Equi-angular mirrors are designed so that each pixel spans an equal angle irrespective of its distance from the center of the image. An equi-angular mirror such as this can provide a resolution superior to the systems discussed above. However, when this system is combined with a camera lens, the combination of the lens and the equi-angular mirror is no longer a projective device, and each pixel does not span exactly the same angle. Therefore, the resolution of the equi-angular mirror is reduced when the mirror is combined with a camera lens.

Ollis, Herman, and Singh, "Analysis and Design of Panoramic Stereo Vision Using Equi-Angular Pixel Cameras", CMU-RI-TR-99-04, Technical Report, Robotics Institute, Carnegie Mellon University, January 1999, disclose an improved equi-angular mirror that is specifically shaped to account for the perspective effect a camera lens adds when it is combined with such a mirror. This improved equi-angular mirror mounted in front of a camera lens provides a simple system for producing panoramic images that have a very high resolution. However, this system does not take into account the fact that there may be certain areas of the resulting panoramic image that a viewer may have no desire to see. Therefore, some of the superior image resolution resources of the mirror are wasted on non-usable portions of the image.

While the benefits of panoramic imaging are desirable in many instances, there are times when a situation may be more suited for use with a traditional camera. One drawback of panoramic imaging is that the available resolution is reduced. Generally, as the coverage area of an image increases, the resolution of the image decreases. Therefore, panoramic images have inherently lower resolutions because of the large field of view that they cover. If a user is interested in viewing a particular bounded area in great detail, a traditional digital or analog camera might be chosen over a panoramic camera. This choice might be preferred, even though the large field of view inherent with panoramic imaging will be sacrificed. Methods have been proposed for obtaining panoramic images with a high-resolution camera. These systems combine a traditional analog or digital video camera with a pan, tilt and zoom system, and couple the pointing direction of the camera to a head tracker device or other computer input device. However, these systems have disadvantages because a pan and tilt apparatus is inherently slow, and the user can experience motion blur and dizziness as the pan and tilt camera attempts to catch up and point in the direction that the user is pointing or looking.

The present invention has been developed in view of the foregoing and to address other deficiencies of the prior art.

SUMMARY OF THE INVENTION

The present invention provides a system for processing panoramic photographic images. In particular, the present invention combines a panoramic imaging system with at least one traditional pan, tilt and/or zoom camera. In one embodiment of the invention, a user may be presented with a wide-angle viewable panoramic image of a scene produced by the panoramic imaging system. The user may "look" at different portions of the viewable panoramic image, i.e. change the field of view of the viewable panoramic image, with a mouse, keyboard, head tracker device, or other pointing device. As the user is viewing different portions of the viewable panoramic image, at least one secondary camera coupled with a pan, tilt and/or zoom controller device, working in the background and unbeknownst to the user, will attempt to "keep up" with the user and move to the various portions of the scene that the user is viewing. The user may then indicate a particular portion of the viewable panoramic image that he or she would like to view in greater detail, and because of the narrow field of view that can be achieved via the pan, tilt and/or zoom controller device, the secondary camera will capture a high-resolution image of that portion of the scene once the camera has finished moving to the appropriate position. The high-resolution portion of the scene captured by the secondary camera may then be processed if necessary in order to correct, for example, the perspective angle, and the high-resolution portion of the scene may then be overlaid onto the appropriate corresponding portion of the wide-angle viewable panoramic image being displayed, presenting that particular portion of the panoramic image in greater detail. The result will be that the portion of the panoramic image the user is interested in will seamlessly become sharper and clearer. In another embodiment, a single camera including an active-pixel image sensor, such as a complementary metal-oxide semiconductor (CMOS) sensor, may be used in the panoramic imaging system, and a second camera will not be needed. In this embodiment, the CMOS camera can present a wide-angle viewable panoramic image of a scene to a user. When the user identifies a portion of the image that he or she is interested in, the windowing capabilities of the CMOS camera can be used to quickly present the user with a high-resolution image of that portion of the scene.

An aspect of the present invention is to provide a system for processing images, the system including a mirror for reflecting an image of a scene, a mounting assembly for mounting the mirror on an axis, wherein the mirror includes a convex reflective surface defined by rotating around the axis an equi-angular shape, or a compensated equi-angular shape, a first camera for capturing the image reflected by the mirror, at least one secondary camera for capturing a portion of the scene, means for mapping pixel data of the image captured by the first camera into a viewable image, and means for cooperatively displaying the viewable image and the portion of the scene captured by the at least one secondary camera.

Another aspect of the present invention is to provide a system for processing images, the system including a mirror for reflecting an image of a scene, a mounting assembly for mounting the mirror on an axis, a first camera for capturing the image reflected by the mirror, at least one secondary camera for capturing a portion of the image reflected by the mirror, means for movably positioning the at least one secondary camera at a plurality of locations adjacent to the mirror or the first camera, means for mapping pixel data of the image captured by the first camera into a viewable image, and means for cooperatively displaying the viewable image and the portion of the image captured by the at least one secondary camera.

A further aspect of the present invention is to provide a system for processing images, the system including a mirror for reflecting an image of a scene, a mounting assembly for mounting the mirror on an axis, wherein the mirror includes a convex reflective surface defined by rotating around the axis an equi-angular shape or a compensated equi-angular shape, a camera including an active-pixel image sensor for capturing at least a portion of the image reflected by the mirror, and means for mapping pixel data of the at least a portion of the image captured by the camera into a viewable image.

Another aspect of the present invention is to provide a method of processing images, the method including the steps of providing a mirror for reflecting an image of a scene, mounting the mirror on an axis, wherein the mirror includes a convex reflective surface defined by rotating around the axis an equi-angular shape or a compensated equi-angular shape, capturing the image reflected by the mirror with a first camera, capturing a portion of the scene with at least one secondary camera, mapping pixel data of the image captured by the first camera into a viewable image, and displaying cooperatively the viewable image and the portion of the scene captured by the at least one secondary camera.

A further aspect of the present invention is to provide a method for processing images, the method including the steps of providing a mirror for reflecting an image of a scene, mounting the mirror on an axis, capturing the image reflected by the mirror with a first camera, movably positioning at least one secondary camera at a plurality of locations adjacent to the mirror or the first camera, capturing a portion of the image reflected by the mirror with the at least one secondary camera, mapping pixel data of the image captured by the first camera into a viewable image, and displaying cooperatively the viewable image and the portion of the image captured by the at least one secondary camera.

Another aspect of the present invention is to provide a method for processing images, the method including the steps of providing a mirror for reflecting an image of the scene, mounting the mirror on an axis, wherein the mirror includes a convex reflective surface defined by rotating around the axis an equi-angular shape or a compensated equi-angular shape, capturing at least a portion of the image reflected by the mirror with a camera including an active-pixel image sensor, and mapping pixel data of the at least a portion of the image captured by the camera into a viewable image.

These and other aspects of the present invention will be more apparent from the following description.

BRIEF DESCRIPTION OF THE DRAWINGS

FIG. 8A is a cross sectional image of a convex reflective mirror before an interior part of the two-dimensional mirror profile is removed.

FIG. 8B illustrates how the lower limit of the controlled vertical field of view can be selected by removing an interior part of the mirror profile in accordance with an embodiment of the present invention.

FIG. 9 illustrates how the lower limit of the controlled vertical field of view can be selected by removing an interior part of the mirror profile in accordance with another embodiment of the present invention.

FIG. 24 is a schematic representation of a system for producing images in accordance with another embodiment of the present invention.

FIG. 25a is a schematic representation of a system for producing images in accordance with another embodiment of the present invention.

FIG. 25b is a schematic representation of a system for producing images in accordance with another embodiment of the present invention.

DETAILED DESCRIPTION OF THE INVENTION

Figure 1:
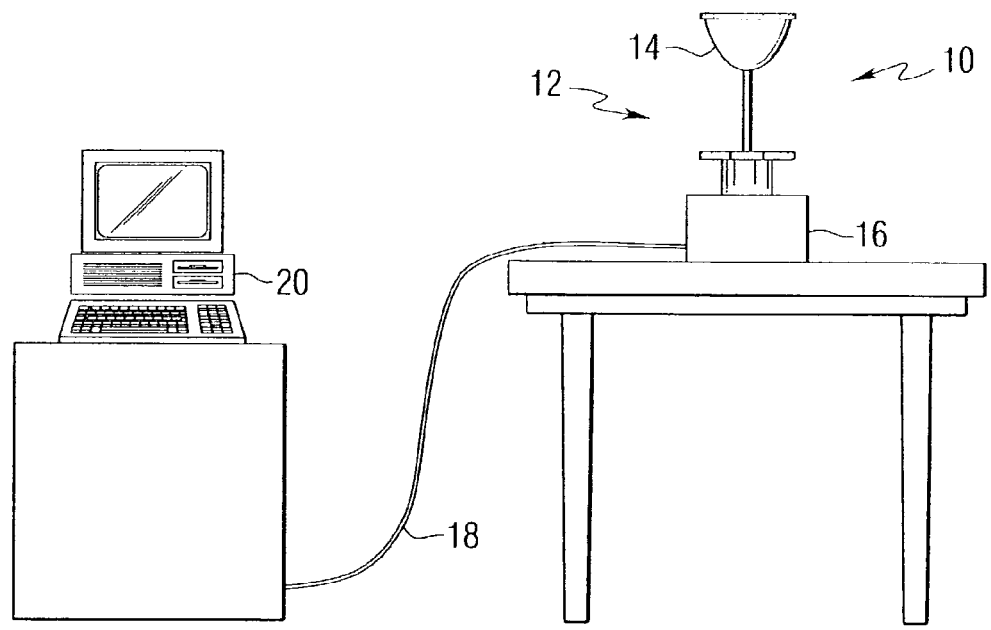
FIG. 1 is a schematic representation of a system for producing panoramic images in accordance with an embodiment of the present invention.

The present invention provides a system for processing photographic images. Referring to the drawings, FIG. 1 is a schematic representation of a system 10 for producing panoramic images. The system includes a panoramic imaging device 12, which can include a mirror 14 and a camera 16 that cooperate to capture and produce an image of a surrounding scene in the form of a two-dimensional array of pixels. In one embodiment, a digital converter device, such as a DV or IIDC digital camera connected through an IEEE-1394 bus, may be used to convert the captured image into pixel data. In another embodiment, the camera may be analog, and a digital converter device such as an analog to digital converter may be used to convert the captured image into pixel data. For the purposes of this invention, the pixels are considered to be an abstract data type to allow for the large variety of color models, encodings and bit depths. Each pixel can be represented as a data word, for example a pixel can be a 32-bit value consisting of four 8-bit channels: representing alpha, red, green and blue information. The image data can be transferred, for example, by way of a cable 18 or wireless link, to a computer 20 for processing in accordance with this invention. Alternatively, the image data can be transferred over the Internet or other computer network to a computer 20 or other processing means for processing. In one embodiment, the image data may be transferred to a server computer for processing in a client-server computer network, as disclosed in copending commonly owned U.S. patent application Ser. No. 10/081,433 filed Feb. 22, 2002, which is hereby incorporated by reference. Such processing may include, for example, converting the raw 2-dimensional array of pixels captured with the panoramic imaging device into an image suitable for viewing.

As used herein, the term "panoramic images" means wide-angle images taken from a field of view of from about 60° to 360°, typically from about 90° to 360°. Preferably, the panoramic visual images comprise a field of view from about 180° to 360°. In a particular embodiment, the field of view is up to 360° in a principal axis, which is often oriented to provide a 360° horizontal field of view. In this embodiment, a secondary axis may be defined, e.g., a vertical field of view. The vertical field of view may be defined with respect to the optical axis of a camera lens, with the optical axis representing 0°. Such a vertical field of view may range from 0.1° to 180°, for example, from 1° to 160°. In one embodiment, the vertical field of view may be controlled in order to maximize the resolution of the portion of the panoramic image that the viewer is most interested in seeing. In order to maximize the resolution of the portion of the panoramic image that the viewer desires to see, the vertical field of view may be controlled in an attempt to eliminate unwanted portions of the panoramic image from the resulting viewable panoramic image. However, the particular controlled vertical field of view chosen may not fully eliminate unwanted portions of the panoramic image from the viewable panoramic image. For example, in order to provide a panoramic image with improved resolution and minimal unwanted portions of the panoramic image, the controlled vertical field of view may range from about 2° to about 160°, preferably from about 5° to about 150°. A particularly preferred controlled vertical field of view that provides panoramic images with improved resolution and minimal unwanted portions of the panoramic image ranges from about 10° to about 140°.

As used herein, the term "improved resolution" means images having a viewable resolution of at least 0.3 M pixel, preferably having a viewable resolution of at least at least 0.75 M pixel. In a particular embodiment, the term "improved resolution" means images having a viewable resolution of at least 1 M pixel. As used herein, the term "high resolution" means images having a viewable resolution of at least 0.3 M pixel, preferably having a viewable resolution of at least at least 1 M pixel. In a particular embodiment, the term "high resolution" means images having a viewable resolution of at least 1 M pixel.

Figure 2:
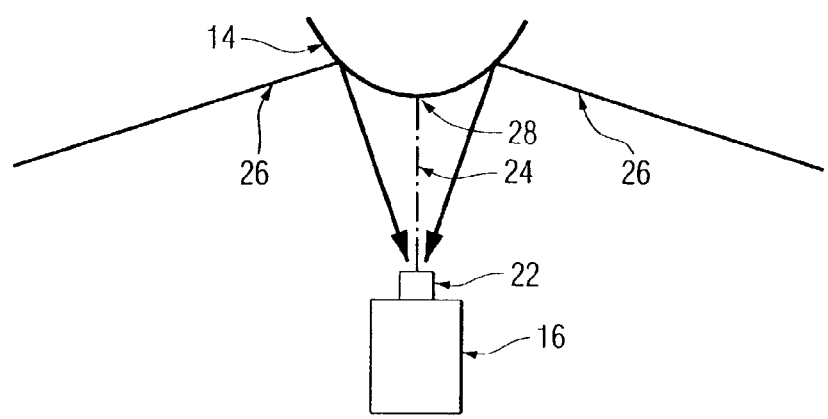
FIG. 2 is a sectional schematic diagram illustrating a camera combined with a convex reflective surface for producing panoramic images in accordance with an embodiment of the present invention.

FIG. 2 is a schematic diagram illustrating a mirror 14 combined with a camera 16, such as the panoramic imaging device 12, for producing panoramic images. Typically the mirror 14 is mounted in front of a camera lens 22 with a suitable mounting device (not shown). The mirror 14 having a central axis 24 gathers light 26 from all directions and redirects it to camera 16. The mirror 14 has a symmetric shape. As used herein, the terms "symmetric" and "symmetrical" mean that the mirror is symmetrical about an axis of rotation. The axis of rotation corresponds to the central axis of the mirror and typically corresponds to the optical axis of the camera used with the mirror. An axial center 28 can be defined, which is at the intersection of the central axis 24 and the surface of the mirror 14.

A panoramic image may be captured with a system, such as the system 10 of FIG. 1, by mounting the camera on a tripod, setting the camera on a level surface such as a table, or holding the camera with the camera pointing up in a vertical direction. For example, when capturing a panoramic image of a room, the camera could be oriented with the camera pointing in a vertical direction towards the ceiling of the room. The resulting panoramic image would show the room with the ceiling at the upper portion of the image and the floor at the lower portion of the image. As used herein, the terms "upper" and/or "top", and the terms "lower" and/or "bottom" refer to a panoramic image oriented in the same way. However, it is to be understood that a panoramic image of a room, for example, may also be captured by orienting the camera in a vertical direction towards the floor of the room, and such an orientation is within the present scope of the invention. For example, the camera may be mounted to a ceiling of a room. When using such an orientation, the terms "upper" and/or "top", and the terms "lower" and/or "bottom" would have the reverse orientation and meaning.

Figure 3:
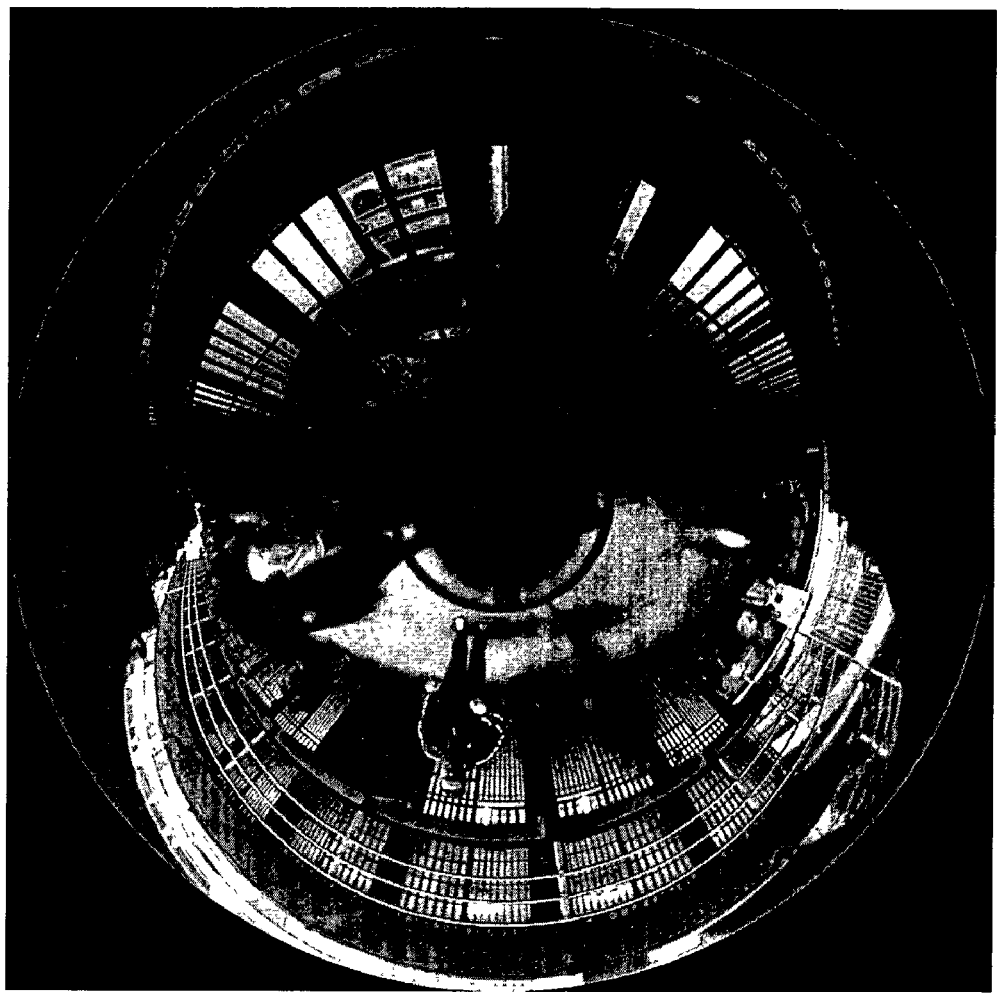
FIG. 3 is a raw 360° image captured with a panoramic camera in accordance with an embodiment of the present invention.
Figure 4:
FIG. 4 is the raw 360° image of FIG. 3 unwarped into a viewable panoramic image in accordance with an embodiment of the present invention.

One common application of such a system is to capture a raw 360° image with the convex reflective surface, and unwarp the raw 360° image into a viewable panoramic image. FIG. 3 shows such a raw 360° image, and FIG. 4 shows the raw 360° image of FIG. 3 unwarped into a viewable panoramic image. As used herein, the term "viewable panoramic image" includes, for example, a panoramic image presented as a rectangular image using a projection onto a cylindrical surface, a panoramic image presented as a six sided cubic, or a panoramic image presented in an equi-rectangular form. However, it is to be understood that panoramic images may be presented in many other desired viewable formats that are known in the art, and these other viewable formats are within the scope of the present invention.

The use of such imaging device has distinct advantages. It is a passive sensor, so power requirements are minimal. It has the potential to be extremely robust, since the sensor is purely solid state and has no moving parts. Furthermore, curved mirrors can be made free of optical distortion that is typically seen in lenses. In addition, the large field of view available offers substantial advantages for panoramic photography, target tracking, obstacle detection, localization, and tele-navigation of machinery.

In the system 10 of FIG. 1, the camera 16 can image a full 360 degrees in azimuth and approach 180 degrees in elevation with an appropriately shaped mirror. Unfortunately, obtaining such a large horizontal and vertical field of view comes at the cost of resolution. This is because a fixed amount of pixels are being spread over a large field of view. For example, if a 3 M pixel camera is used with a standard 30×40 degree camera lens, the resulting picture will have a relatively high pixel density. However, if the same 3 M pixel camera is used with a panoramic mirror to capture a panoramic image, the same amount of pixels will now be spread over a field of view as large as 360×180 degrees. In order for the system 10 of FIG. 1 to be beneficial, a panoramic mirror must be used that produces a panoramic image with an improved resolution. Furthermore, since the amount of available resolution from a panoramic mirror is limited, it is very important to ensure that only a minimal amount, if any, of this resolution is utilized on portions of the panoramic image that are of least interest to the viewer.

For example, in the system 10 of FIG. 1, if a panoramic image is captured with a 180° vertical field of view, a viewer will typically be most interested in the portion of the panoramic image that is off to the sides of the mirror, possibly from about 40° to about 140°, and will typically be least interested in the portion of the panoramic image that appears closer to the bottom of the panoramic image, from about 0° to 40°, or the portion of the image that appears closer to the top of the panoramic image, from about 140° to 180°. Unfortunately, these least desirable portions of the panoramic image are still captured by the panoramic mirror and will appear in the resulting viewable panoramic image. Thus, the available resolution of the panoramic mirror is wasted on these least desired portions of the panoramic image.

An embodiment of the present invention provides a panoramic mirror designed with a controlled vertical field of view. As used herein, the term "controlled vertical field of view" refers to a vertical field of view that is adjusted in order to minimize unwanted images from being captured by the panoramic mirror and thereby appearing in the viewable panoramic image, and to maximize the resolution of the panoramic image that the user desires to see. The controlled vertical field of view may range from about 2° to about 170°, preferably from about 5° to about 150°. A particularly preferred controlled vertical field of view that provides panoramic images with improved resolution and minimal unwanted portions of the panoramic image ranges from about 10° to about 140°. In this embodiment, the superior resolution qualities of the mirror provide resulting panoramic images with an improved resolution, while the controlled vertical field of view further increases the resolution of the resulting viewable panoramic image.

In a preferred embodiment, a mirror shape may be used that is truly equi-angular when combined with camera optics. In such an equi-angular mirror/camera system, each pixel in the image spans an equal angle irrespective of its distance from the center of the image, and the shape of the mirror is modified in order to compensate for the perspective effect a camera lens adds when combined with the mirror, thereby providing improved high-resolution panoramic images.

Figure 5:
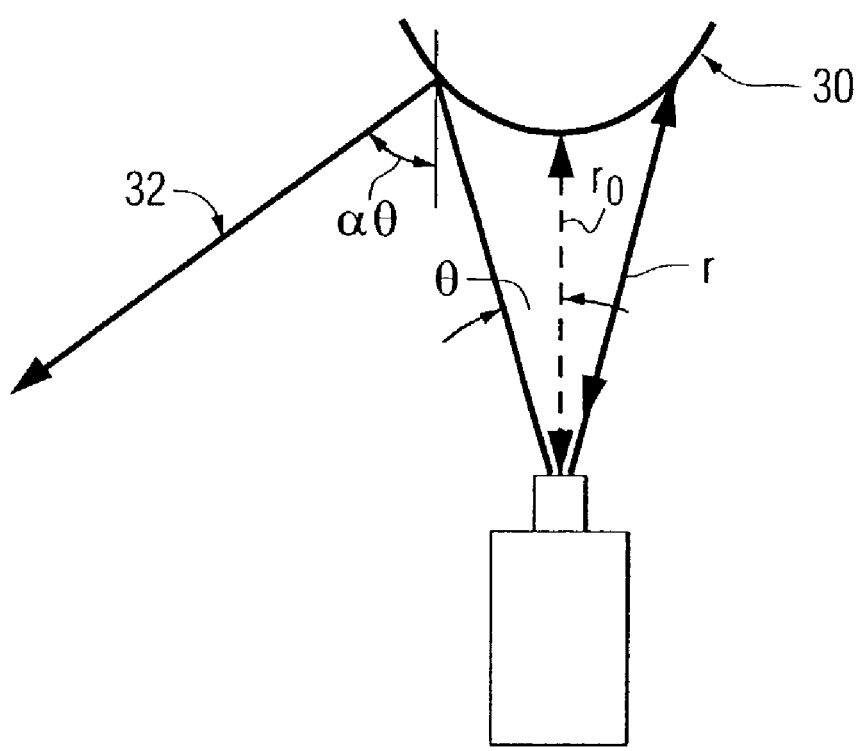
FIG. 5 is the geometry of an equi-angular mirror.

FIG. 5 shows the geometry of such an equi-angular mirror 30. The reflected ray 32 is magnified by a constant gain of $\alpha$, irrespective of location along the vertical profile. The general form of these mirrors is given in equation (1):

$$\cos\left(\theta\frac{1+\alpha}{2}\right) = (r/r_0)^{-(1+\alpha)/2} \quad (1)$$

For different values of α, mirrors can be produced with a high degree of curvature or a low degree of curvature, while still maintaining their equi-angular properties. In one embodiment, α ranges from about 3 to about 15, preferably from about 5 to about 12. In a particular embodiment, α is chosen to be 11.

Figure 6:
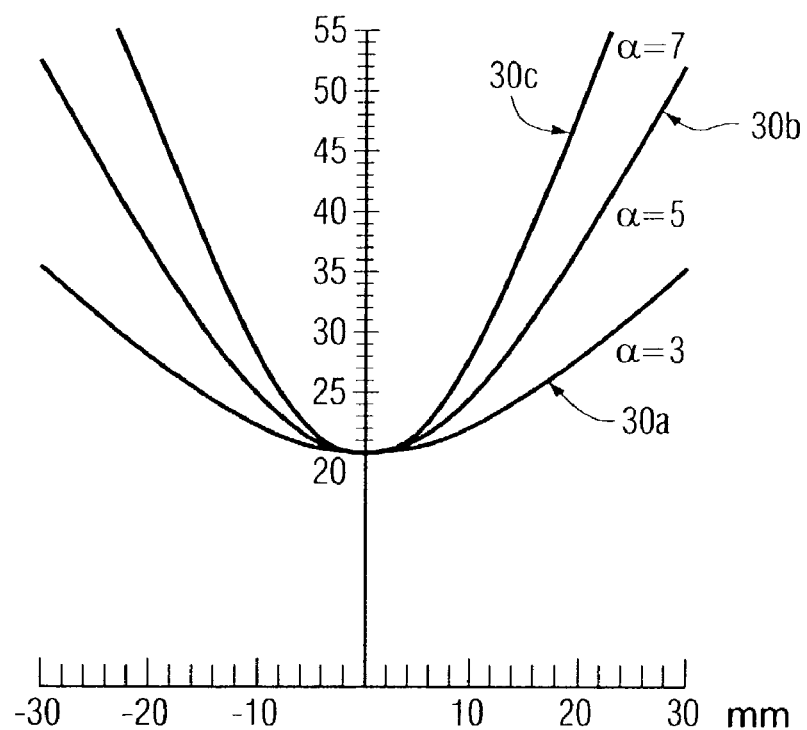
FIG. 6 is equiangular mirror profiles for a gain α of 3, 5, and 7.

FIG. 6 shows mirror profiles 30a, 30b, and 30c with curvatures corresponding to α=3, 5, and 7, respectively. One advantage of these mirrors is that the resolution is unchanged when the camera is pitched or yawed.

It has been determined that the addition of a camera with a lens introduces an effect such that each pixel does not span the same angle. This is because the combination of the mirror and the camera is no longer a projective device. Hence, to be exactly equi-angular, the mirror may be shaped to account for the perspective effect of the lens and the algorithms must be modified. Such a modified equi-angular mirror shape is defined herein as a "compensated equi-angular mirror."

It is possible to make a small angle approximation by assuming that each pixel spans an equal angle. The following equation (2) can be used to derive the mirror shape:

$$\frac{dr}{d\theta} = r\cot\left(k\theta + \frac{\pi}{2}\right) \quad (2)$$
$$k = (-1-\alpha)/2$$

Since the camera is still a projective device this typically only works for small fields of view. Surfaces of mirrors in which each pixel truly corresponds to an equal angle are shapes that satisfy the polar coordinate equation (3) below:

$$\frac{dr}{d\theta} = r\cot\left(k\tan\theta + \frac{\pi}{2}\right) \quad (3)$$

The advantage of using equation (2) is that the surfaces produced have a closed-form solution, whereas equation (3) must be solved numerically. However, the result of solving equation (3) numerically is that it produces a profile of the mirror that produces a truly equi-angular relation where each pixel in the image has the same vertical field of view.

Figure 7:
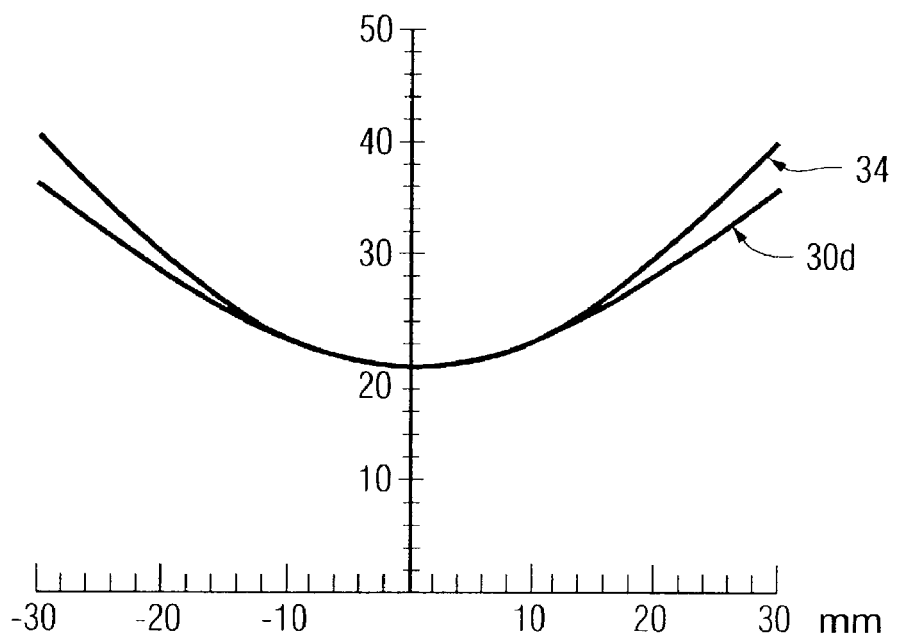
FIG. 7 is an equi-angular mirror that provides approximately equal angles for each pixel and a compensated equi-angular mirror that provides exactly equal angles for each pixel when α is equal to 3.

FIG. 7 shows the difference in the mirror shapes. For α equal to 3, an equi-angular mirror 30d that provides approximately equal angles for each pixel and a compensated equi-angular mirror 34 that provides truly equal angles for each pixel is shown.

A typical convex mirror will typically have a continuous surface across any diameter. Because of this constraint, a significant portion of the imaged surface area of the mirror is likely to reflect portions of a panoramic image that the viewer is least interested in seeing. The pixels in the resulting photograph that reflect such unwanted portions of the panoramic image end up not being efficiently utilized. It is desirable to minimize these unwanted portions of the panoramic image. This is especially important when resolution is at a premium, as is the case with panoramic mirrors.

In one embodiment, a panoramic mirror is fabricated with a controlled vertical field of view. By fabricating a mirror with such a controlled vertical field of view, less desired portions of the panoramic image can be substantially reduced or eliminated from the resulting panoramic image. A compensated equi-angular mirror is most suited to be used in this embodiment. This is because the uniform distribution of resolution along any radius of the mirror provides the most effective elimination of less desired portions of the panoramic image, in addition to producing high-resolution panoramic images.

In one embodiment, in order to select the lower limit of the controlled vertical field of view, a convex shaped panoramic mirror, such as a compensated equi-angular panoramic mirror, can be fabricated into a point at the center of the mirror. As an illustration, a two-dimensional profile of such a mirror can be depicted by removing a conical portion from the center of the two-dimensional mirror profile and constricting the resulting two-dimensional mirror profile at the center to form a point. This constricted shape is illustrated in the sectional views shown in FIGS. 8A and 8B. A cross sectional image of the profile as shown in FIG. 8A may be modified by "trimming" an equal amount of surface 34 on either side of the central axis 24. The two separated segments can then be brought together, forming a point 36, as shown in FIG. 8B. The entire portion of the surface to be removed 38 corresponds to the angle 2A and is shown in FIG. 8A. This is the portion of the mirror that would normally reflect portions of the panoramic image towards the bottom of the surrounding scene that the viewer is most likely not interested in viewing. As an example, angle A ranges from about 2° to about 45°, preferably from about 5° to about 30°. In a particular embodiment, angle A is about 10°.

As another illustration, shown in FIG. 9, the unwanted portion of the mirror 40 to be removed may be determined by tracing a light ray 42 as it reflects from the camera lens 22 to a mirror 44, and then from the mirror 44 at the desired angle A, corresponding to the lower limit of the controlled vertical field of view. If the light ray 42 reflects from the mirror 44 at a desired angle A, then the light ray 42 will reflect from the camera lens 22 to the mirror 44 at an angle A/α, with α being the gain of the mirror. The portions of the mirror 46 that are encompassed by the angle A/α on either side of the central axis of the mirror comprise the unwanted portion 40 of the mirror to be removed.

Figure 10:
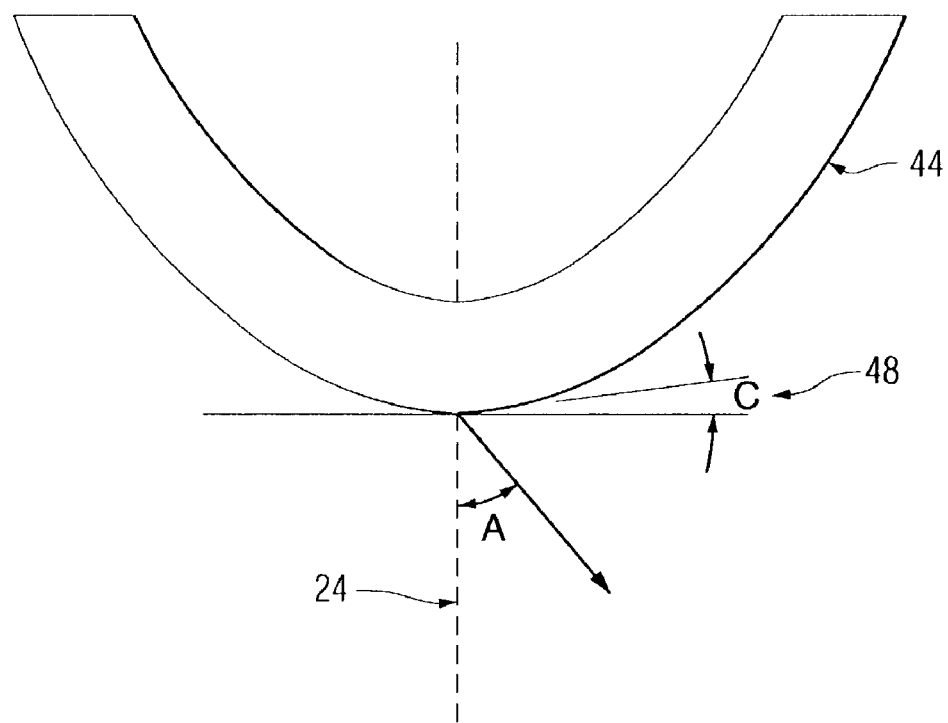
FIG. 10 shows how an angle C can be formed with respect to a first plane perpendicular to a central axis at a point of intersection between the central axis and a mirror, in accordance with an embodiment of the present invention.

Once a two-dimensional mirror profile is developed, as shown in FIG. 8B, an angle C can be formed, shown in FIG. 10 as 48, with respect to a first plane perpendicular to the central axis 24 at a point of intersection between the central axis and the mirror 44. This angle C is dependant upon angle A, which defines the lower limit of the controlled vertical field of view. Equation (4) shows the relationship between angle C and angle A as:

$$C = A/2 \quad (4)$$

In one embodiment, Angle C ranges from about 0.5° to about 20°, preferably from about 1° to about 10°, more preferably from about 2° to about 8°. In a particular embodiment, angle C is about 5°.

For a compensated equi-angular panoramic mirror manufactured with a total cone angle of 2A removed from the center of the mirror, the relationship that describes the resulting mirror profile can now be written in equation (5) as:

$$\frac{dr}{d\left(\theta + \frac{A}{\alpha}\right)} = r\cot\left[k\tan\left(\theta + \frac{A}{\alpha}\right) + \frac{\pi}{2}\right] \quad (5)$$

As is the case with equation (3), equation (5) must also be solved numerically based on various values substituted for θ. θ is the angle that a light ray makes with the central axis as it reflects off of a point on the surface of the mirror and into the camera lens.

Figure 11:
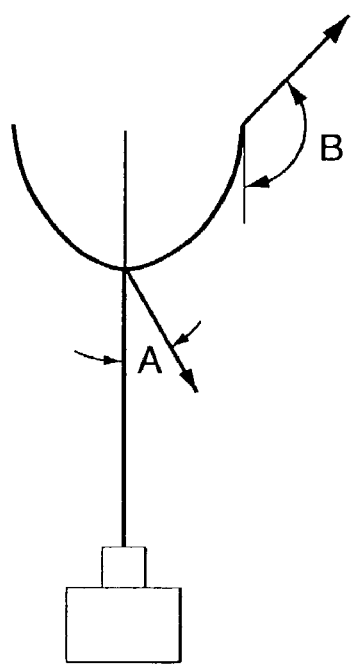
FIG. 11 shows how the upper limit of the controlled vertical field of view can be selected in accordance with an embodiment of the present invention.

In another embodiment, the upper limit of the controlled vertical field of view can be denoted by angle B, shown in FIG. 11. Angle B may be selected by changing the bounds used to numerically solve equation (5). Referring to equation (5), $dr/d(\theta+(A/\alpha))$ can be evaluated at a range of points by integrating between θ=A/α and θ=B/α. This would result in a mirror shape with an upper limit to the controlled vertical field of view, angle B, as desired. As an example, angle B ranges from about 95° to about 180°, preferably from about 120° to about 170°. In a particular embodiment, angle B is about 140°.

Figure 12:
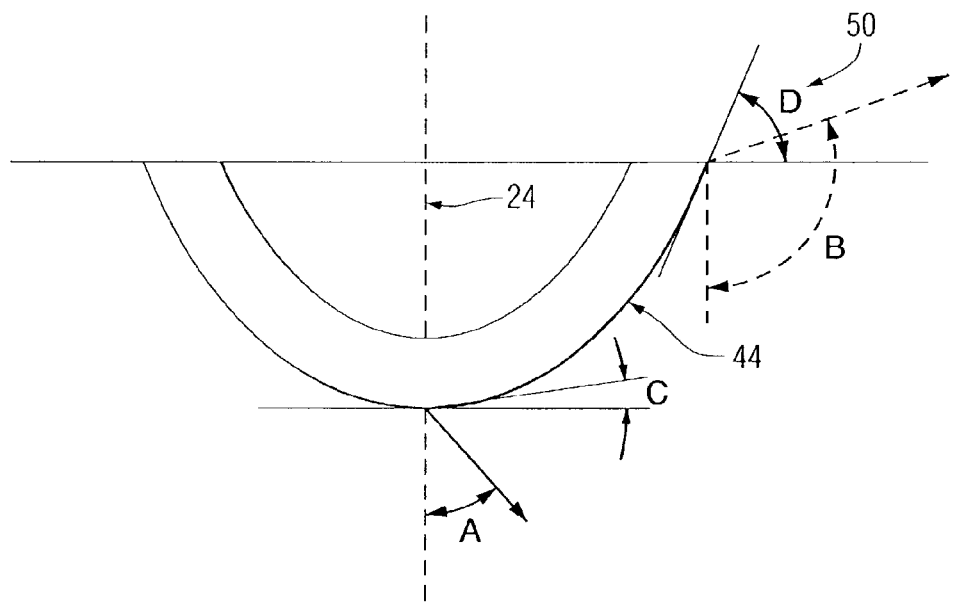
FIG. 12 shows how an angle D can be formed with respect to a second plane perpendicular to the central axis at an end of the mirror opposite the point of intersection between the central axis and the mirror.

Once a two-dimensional mirror profile is developed with an angle B chosen, as shown in FIG. 11, an angle D can be formed, shown in FIG. 12 as 50, with respect to a second plane perpendicular to the central axis 24 at an end of the mirror 44 opposite the point of intersection between the central axis and the mirror. This angle D is dependant upon angle A, which defines the lower limit of the controlled vertical field of view, and angle B, which defines the upper limit of the controlled vertical field of view. Equation (6) shows the relationship between angle D, angle A, and angle B as:

$$D = \frac{((B-A)/\alpha + \beta)}{2} \quad (6)$$

Angle D ranges from about 50° to about 100°, preferably from about 65° to about 90°, more preferably from about 70° to about 85°. In a particular embodiment, angle D is about 76°.

In practice, a panoramic mirror with a controlled vertical field of view may be formed by generating a two-dimensional profile of such a mirror with the selected angle A, as depicted in FIG. 8B, choosing an appropriate value for B, as shown in FIG. 11, and then rotating the resulting two-dimensional profile around the axis of rotation to form a surface of revolution.

In an embodiment of the invention, A is chosen to be 10°, B is chosen to be 140°, and α is chosen to be 11. Substituting these values in equation (5), and solving the equation numerically, a unique mirror shape is produced with an angle C of about 5° and an angle D of about 76°. This unique mirror shape reflects panoramic images with a resolution unparalleled in the prior art. This superior resolution is obtained from a combination of the compensated equi-angular properties of the panoramic mirror, and the fact that the resolution has been further optimized by controlling the appropriate vertical field of view for the mirror. In this embodiment, the primary concern is providing a viewable panoramic image with an improved resolution, not eliminating central obscurations from the viewable panoramic image.

Figure 13:
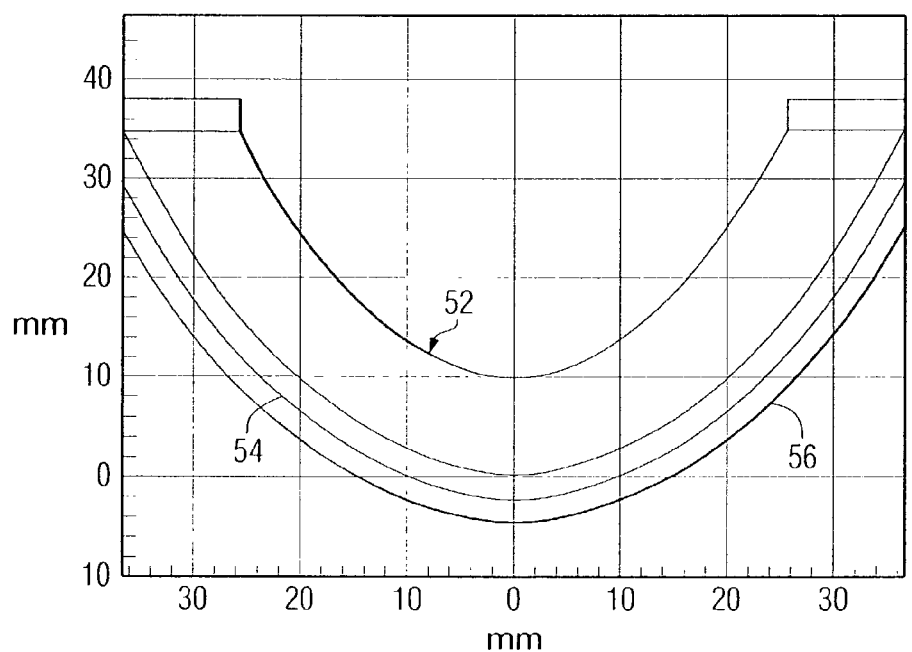
FIG. 13 is a cross-sectional view of a compensated equi-angular mirror with a controlled vertical field of view in accordance with an embodiment of the present invention.

FIG. 13 shows a cross-sectional view of the resulting mirror shape. In a preferred embodiment, the panoramic mirror comprises a substrate 52 made of PYREX glass coated with a reflective surface 54 made of aluminum, and with a silicon protective coating 56. In this embodiment, the smoothness of the mirror is ¼ of the wavelength of visible light.

In one embodiment, in order to provide a viewable panoramic image that the user is interested in seeing, and at the best resolution possible, all of the unwanted portions of the viewable panoramic image may not be fully eliminated. These unwanted portions may include, for example, the camera, the camera lens, the mount holding the mirror in front of the camera and other unwanted foreground images. For example, the vertical field of view of the viewable panoramic image that the viewer wishes to see may be 40° to 140°, while the controlled vertical field of view of the viewable panoramic image may be 10° to 140°. As used herein the term "desired vertical field of view" means the vertical field of view corresponding to a viewable panoramic image that the viewer is interested in viewing. The desired vertical field of view may be equal to or less than the controlled vertical field of view. The desired vertical field of view may range from about 2° to about 170°, preferably from about 15° to about 150°. A particularly preferred desired vertical field of view that a viewer would typically be interested in viewing ranges from about 40° to about 140°.

In one embodiment, a compensated equi-angular mirror with a controlled vertical field of view may be manufactured with a hole centered at the axial center 28 of the mirror in order to accommodate various mounting devices. The mounting hole may range in diameter from about 0.05 cm to about 15 cm, preferably from about 0.1 cm to about 5 cm. In a particular embodiment the mounting hole is 0.64 cm in diameter.

Figure 14:
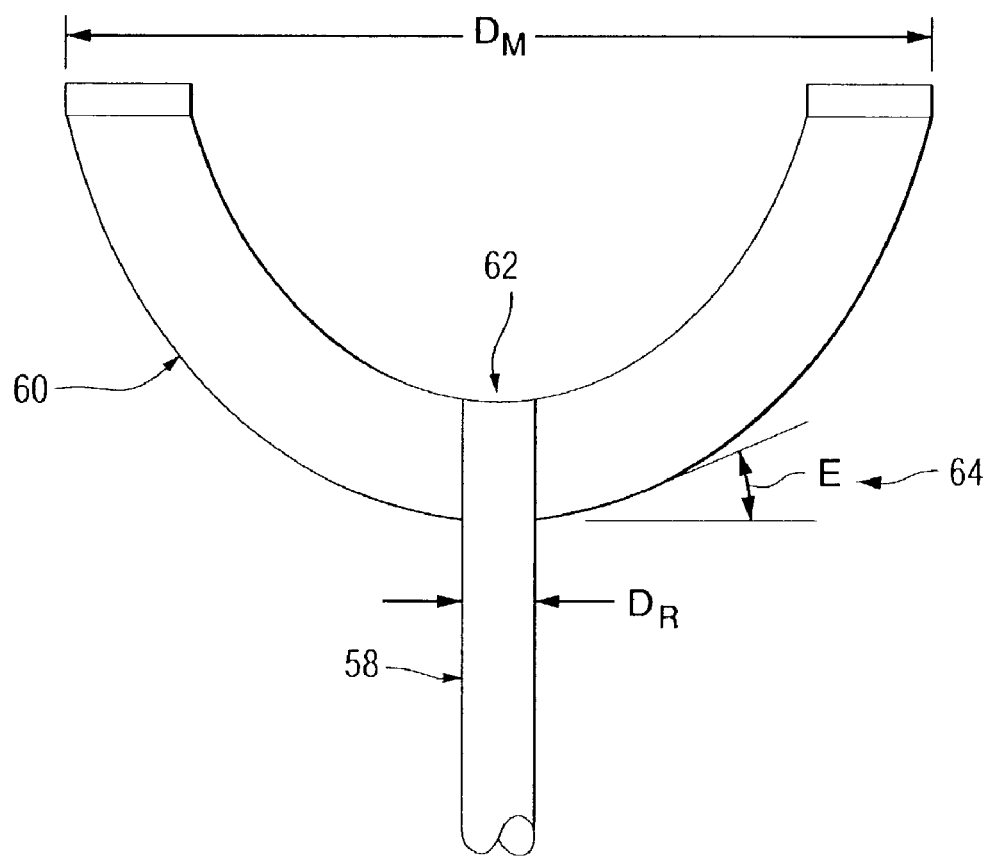
FIG. 14 illustrates a means for mounting a panoramic mirror in front of a camera in accordance with an embodiment of the present invention.

In one embodiment, as shown schematically in FIG. 14, a panoramic mirror with a profile substantially described by equation (4) can be fitted with a mounting assembly, such as a rod 58, to accommodate mounting a mirror 60 in front of a camera (not shown). The shape of the rod may be substantially cylindrical. The mirror 60 can be produced with a hole 62 at the axial center of the mirror in order to accommodate the rod 58. The mounting hole may range in diameter from about 0.05 cm to about 15 cm, preferably from about 0.1 cm to about 5 cm. In a particular embodiment the mounting hole is 0.64 cm in diameter. The rod 58 may range in diameter $D_R$ from about 0.05 cm to about 15 cm, preferably from about 0.1 cm to about 5 cm. In a particular embodiment the rod is 0.64 cm in diameter. The rod 58 may be of various lengths. For example, the rod 58 may range in length from about 3 cm to about 12 cm, preferably from about 4 cm to about 11 cm. In a particular embodiment the rod is about 10.8 cm in length. In this embodiment, the diameter $D_M$ of the mirror 60 may range from about 0.3 cm to about 60 cm, preferably from about 0.5 cm to about 20 cm. In a particular embodiment the diameter of the mirror is 7.94 cm in diameter. In this embodiment, a ratio of the diameter of the rod 58 to the diameter of the mirror 60 may be defined as $D_R:D_M$. $D_R:D_M$ may range from about 1:4, preferably from about 1:5. In a particular embodiment, $D_R:D_M$ is 1:12.5. In this embodiment, an angle E 64 may be formed with respect to a first plane perpendicular to the central axis of the mirror at a point of intersection between the rod and the mirror. Angle E is dependant upon angle A, which defines the lower limit of the controlled vertical field of view. Equation (7) shows the relationship between angle E and angle A as:

$$E=(a \tan(r_R/r_{camera})+\alpha \cdot a \tan(r_R/r_{camera})+A)/2 \quad (7)$$

In equation (7), $r_R$ is the radius of the rod. Angle E ranges from about 5° to about 30°, preferably from about 10° to about 20°, more preferably from about 12° to about 16°. In a particular embodiment, angle E is about 14°.

Figure 15:
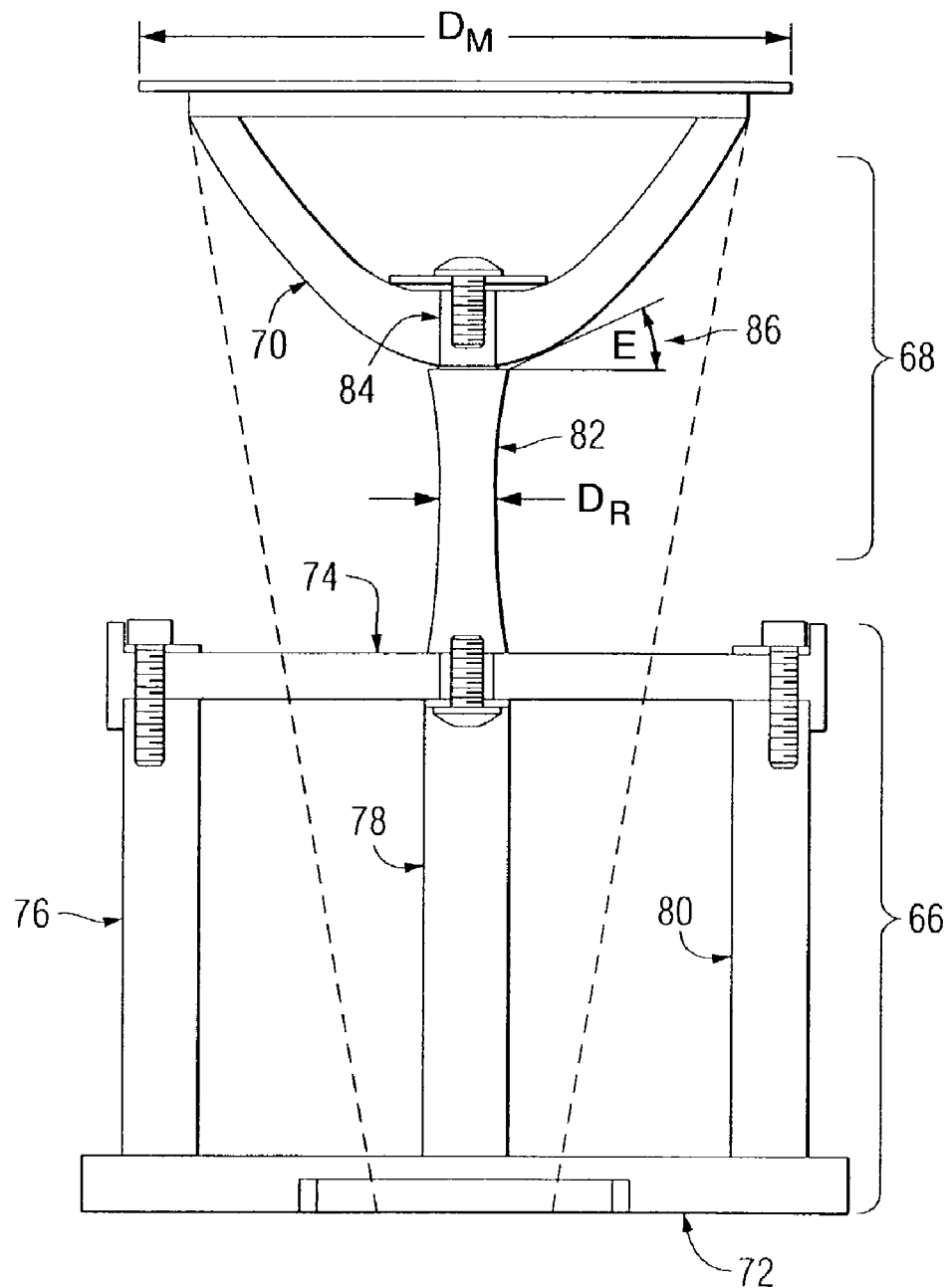
FIG. 15 shows an alternate means for mounting a panoramic mirror in front of a camera in accordance with an embodiment of the present invention.

In another embodiment, a compensated equi-angular mirror with a controlled vertical field of view can be mounted in front of a camera with a mounting assembly as schematically illustrated in FIG. 15. This mounting assembly comprises a primary stage 66 which attaches directly to a camera (not shown), and a secondary stage 68 which is affixed to the primary stage and supports a mirror 70 in front of a camera. The primary stage 66 comprises a first disc 72 and a second disc 74 with a first vertical member 76, a second vertical member 78 and a third vertical member 80 placed between the two discs as shown in FIG. 15. The first disc 72 and the second disc 74 may range in diameter from about 3 cm to about 12 cm, preferably from about 5 cm to about 12 cm. In a particular embodiment the diameter of the first disc or the second disc may be about 8 cm. In this embodiment, the length of the first, second and third vertical members may range in length from about 1 cm to about 8 cm, preferably from about 2 cm to about 7 cm. In a particular embodiment the first vertical member, second vertical member and third vertical member is each about 5.9 cm in length. In this embodiment, the length of the primary stage may range in length from about 1 cm to about 8 cm, preferably from about 2 cm to about 7 cm. In a particular embodiment the primary stage is about 6.5 cm in length. In one embodiment, the secondary stage 68 may comprise a rod 82 with one end of the rod attached to the second disc 74 of the primary stage 66 and the other end of the rod supporting the mirror 70 in front of a camera. The shape of the rod may be substantially cylindrical. In this embodiment, the mirror 70 may be produced with a hole 84 at the axial center of the mirror in order to accommodate the rod. The mounting hole may range in diameter from about 0.05 cm to about 15 cm, preferably from about 0.15 cm to about 5 cm. In a particular embodiment the mounting hole is 0.64 cm in diameter. The rod 82 may range, along the length thereof, in diameter $D_R$ from about 0.05 cm to about 15 cm, preferably from about 0.15 cm to about 5 cm. In a particular embodiment the rod is 0.64 cm in diameter. The rod 82 may be of various lengths, for example, the rod may range in length from about 2 cm to about 6 cm, preferably from about 3 cm to about 5 cm. In a particular embodiment the rod is about 4.3 cm in length. In this embodiment, the $D_M$ of the mirror may range from about 0.3 cm to about 60 cm, preferably from about 0.6 cm. to about 20 cm. In a particular embodiment the diameter of the mirror is 7.94 cm. in diameter. In this embodiment, a ratio of the diameter of the rod to the diameter of the mirror may be defined as $D_R:D_M$. $D_R:D_M$ may range from about 1:4, preferably from about 1:5. In a particular embodiment, $D_R:D_M$ is about 1:12.5. In this embodiment, an angle E 86 may be formed with respect to a first plane perpendicular to the central axis of the mirror at a point of intersection between the rod and the mirror. Angle E is dependant upon angle A, which defines the lower limit of the controlled vertical field of view. Equation (7), above, shows the relationship between angle E and angle A. Angle E ranges from about 5° to about 30°, preferably from about 10° to about 20°, more preferably from about 12° to about 16°. In a particular embodiment, angle E is about 14°.

In a preferred embodiment, a compensated equi-angular mirror with a desired vertical field of view having a lower limit A' of about 40° and an upper limit B' of about 140° is designed with a controlled vertical field of view having an angle A equal to about 10° and an angle B equal to about 140°, an $\alpha$ equal to about 11, and a diameter $D_M$ of about 8 cm. The mirror may be placed at a distance $r_{camera}$ from the camera of about 12 cm, and may be placed on a mounting device with a diameter $d_{mount}$ of about 4.25 cm. The mirror is typically placed at a distance $r_{mount}$ from the widest portion of the mirror mount of about 4.7 cm. In this embodiment, the mirror may be mounted in front of a camera sold under the designation NIKON 990 by NIKON, or a camera sold under the designation NIKON 995 by NIKON. The mirror may be mounted on a rod that is about 0.64 cm thick. In this embodiment, a unique mirror shape is produced with an angle E of about 14° and an angle D of about 76°. In this embodiment, the primary concern is providing a high-resolution viewable panoramic image, not eliminating central obscurations from the viewable panoramic image.

A unique aspect of the present invention is that any video or still camera that will focus on the mirror surface may be used. Since the mirror shape can be designed to account for different distances that the mirror may be placed from a lens of a camera, virtually any video or still camera will work with the system of the present invention.

Once a camera has captured an image of a scene reflected from an attached mirror, this raw image must be converted or "unwarped" into a viewable panoramic image.

In one embodiment, a method and apparatus for processing raw images of a scene reflected by a mirror and captured with a camera may be used with the system of the present invention as disclosed in copending commonly owned U.S. patent application Ser. No. 10/081,545 filed Feb. 22, 2002, which is hereby incorporated by reference. In this embodiment, image processing may be performed using a software application, hereinafter called PhotoWarp, that can be used on various types of computers, such as Mac OS 9, Mac OS X, and Windows platforms. The software can process images captured with a panoramic imaging device, such as the device 12 of FIG. 1, and produce panoramic images suitable for viewing. The resulting panoramas can be produced in several formats, including flat image files (using several projections), QuickTime VR movies (both cylindrical and cubic panorama format), and others.

Figure 16:
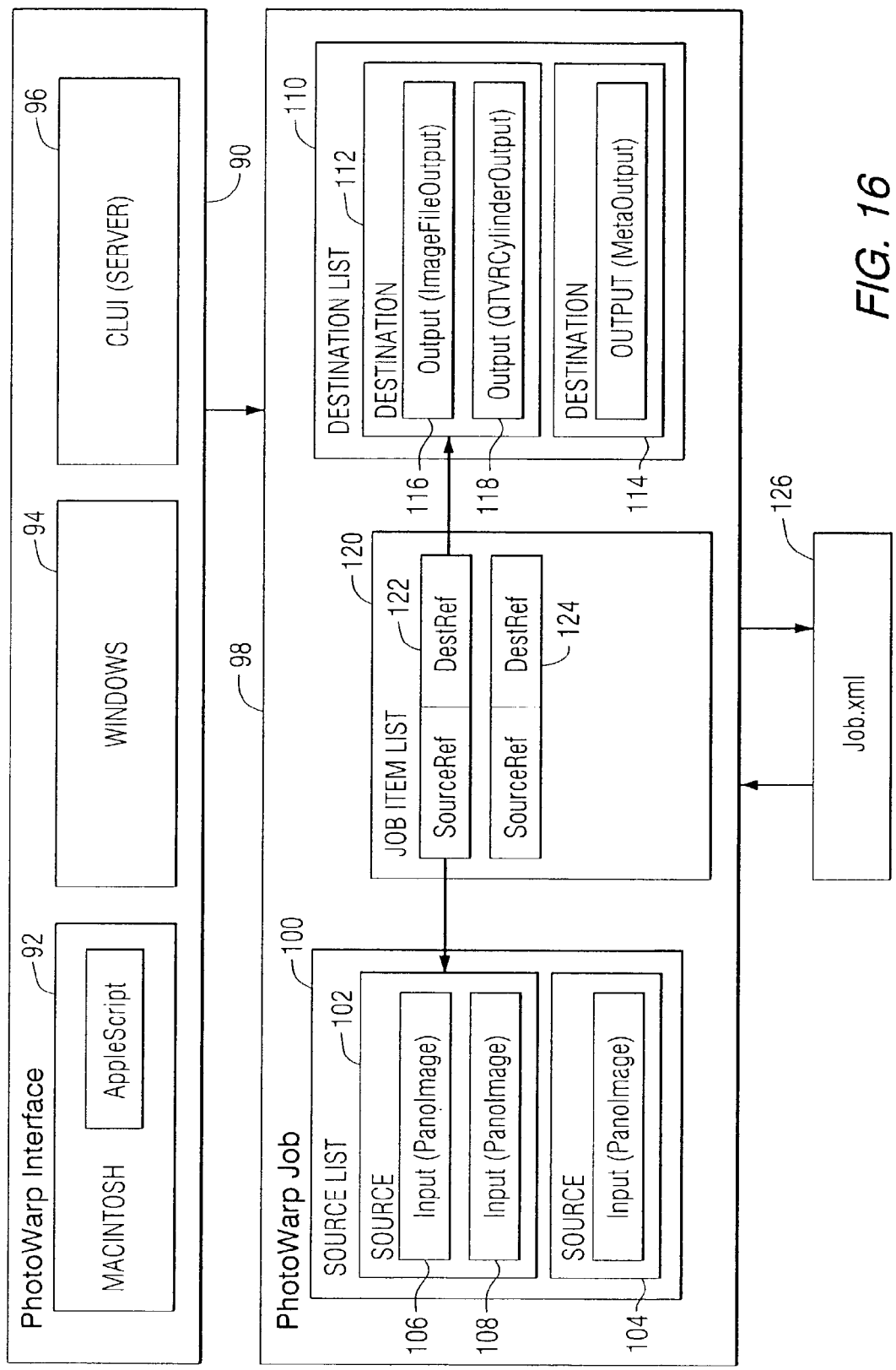
FIG. 16 is a functional block diagram that illustrates the interface and job functions of software that can be used with the system of the invention.

FIG. 16 is a functional block diagram that illustrates the interface and job functions of software that can be used to produce viewable panoramic images. Block 90 shows that the interface can operate in Macintosh 92, Windows 94, and server 96 environments. A user uses the interface to input information to create a Job that reflects the user's preferences concerning the format of the output data. User preferences can be supplied using any of several known techniques including keyboard entries, or more preferably, a graphical user interface that permits the user to select particular parts of a raw image that are to be translated into a form more suitable for viewing.

The PhotoWarp Job 98 contains a source list 100 that identifies one or more source image groups, for example 102 and 104. The source image groups can contain multiple input files as shown in blocks 106 and 108. The PhotoWarp Job 98 also contains a destination list 110 that identifies one or more destination groups 112 and 114. The destination groups can contain multiple output files as shown in blocks 116 and 118. A Job item list 120 identifies the image transformation operations that are to be performed, as illustrated by blocks 122 and 124. The PhotoWarp Job can be converted to XML or alternatively created in XML as shown by block 126.

Figure 17:
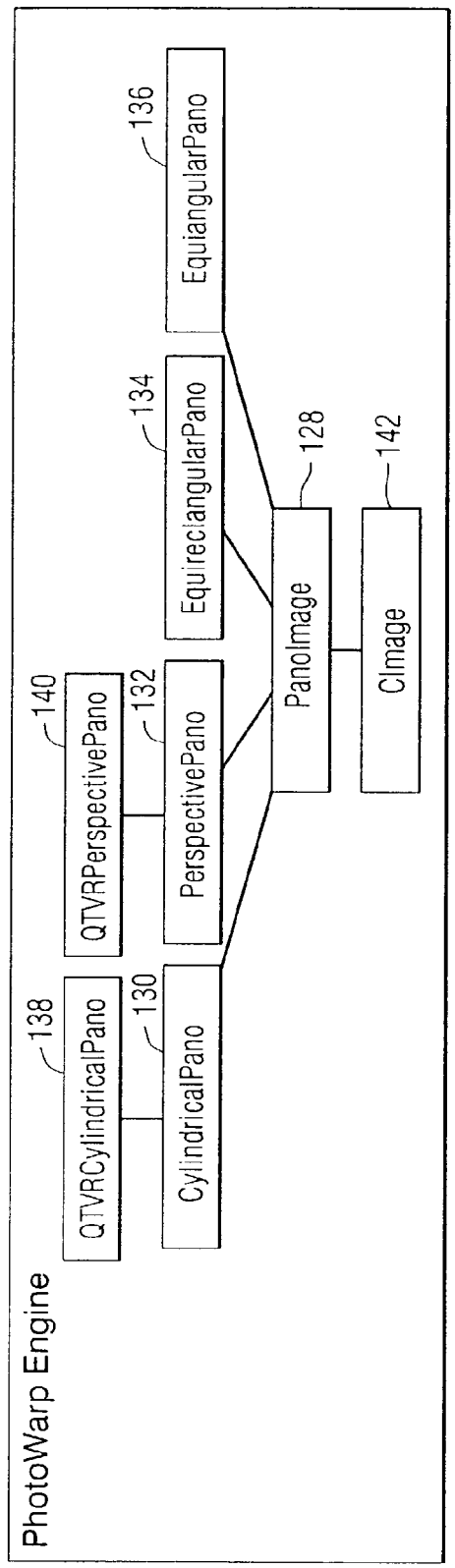
FIG. 17 is a functional block diagram that illustrates the PhotoWarp functions of software that can be used with the system of the invention.

FIG. 17 is a functional block diagram that illustrates several output image options that can be used when practicing the method of the invention. The desired output image is referred to as a PanoImage. The PanoImage 128 can be one of many projections, including Cylindrical Panoramic 130, Perspective Panoramic 132, Equirectangular Panoramic 134, or Equiangular Panoramic 136. The Cylindrical Panoramic projection can be a QTVR Cylindrical Panoramic 138 and the Perspective Panoramic projection can be a QTVR Perspective Panoramic 140. The PanoImage is preferably a CImage class image as shown in block 142. Alternatively, the PanoImage can contain a CImage, but not itself be a CImage.

Figure 18:
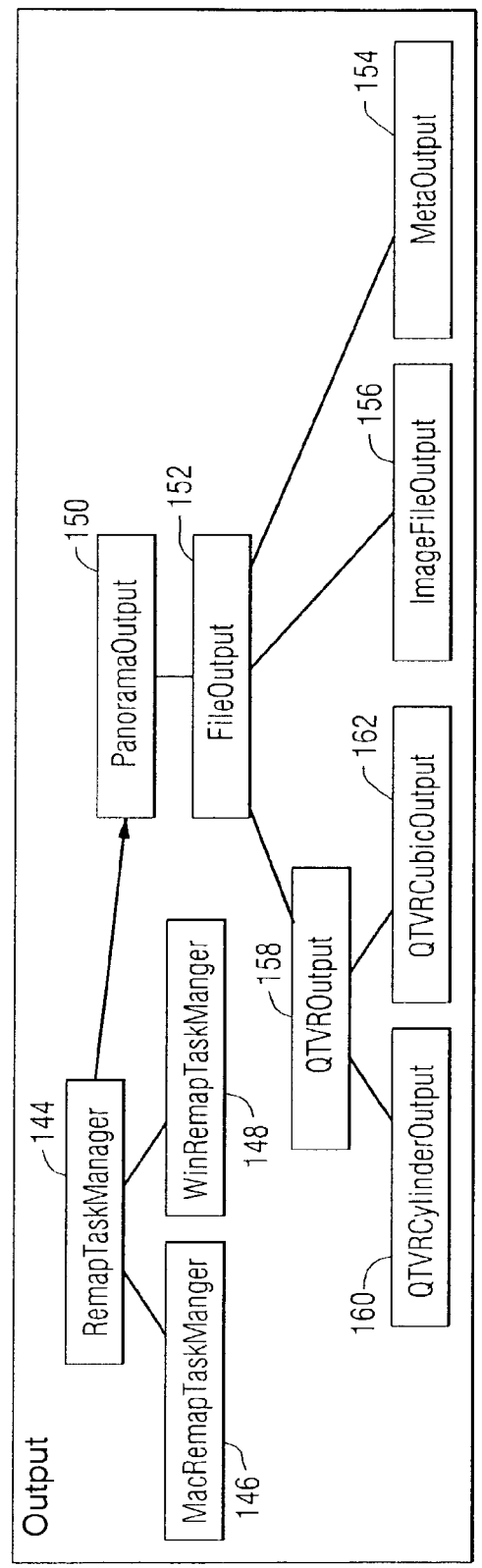
FIG. 18 is a functional block diagram that illustrates the output functions of software that can be used with the system of the invention.

FIG. 18 is a functional block diagram that illustrates the output functions that can be used in producing a viewable panoramic image. A Remap Task Manager 144, which can be operated in a Macintosh or Windows environment as shown by blocks 146 and 148 controls the panorama output in block 150. The panorama output is subsequently converted to a file output 152 that can be in one of several formats, for example MetaOutput 154, Image File Output 156 or QTVR Output 158. Blocks 160 and 162 show that the QTVR Output can be a QTVR Cylindrical Output or a QTVR Cubic Output.

The preferred embodiment of the software includes a PhotoWarp Core that serves as a cross-platform "engine" which drives the functionality of PhotoWarp. The PhotoWarp Core handles all the processing tasks of PhotoWarp, including the reprojection or "unwarping" process that is central to the application's function.

PhotoWarp preferably uses a layered structure that maximizes code reuse, cross-platform functionality and expandability. The preferred embodiment of the software is written in the C and C++ languages, and uses many object-oriented methodologies. The main layers of the application are the interface, jobs, a remapping engine, and output tasks.

The PhotoWarp Core refers to the combination of the Remapping Engine, Output Tasks, and the Job Processor that together do the work of the application. The interface allows users to access this functionality.

The Remapping Engine, or simply the "Engine" is an object-oriented construct designed to perform arbitrary transformations between well-defined geometric projections. The Engine was designed to be platform independent, conforming to the ANSI C++ specification and using only C and C++ standard library functions. The Engine's basic construct is an image object, represented as an object of the CImage class. An image is simply a two-dimensional array of pixels. Pixels are considered to be an abstract data type to allow for the large variety of color models, encodings and bit depths. In one example, a Pixel is a 32-bit value consisting of four 8-bit channels: alpha, red, green and blue.

Figure 19:
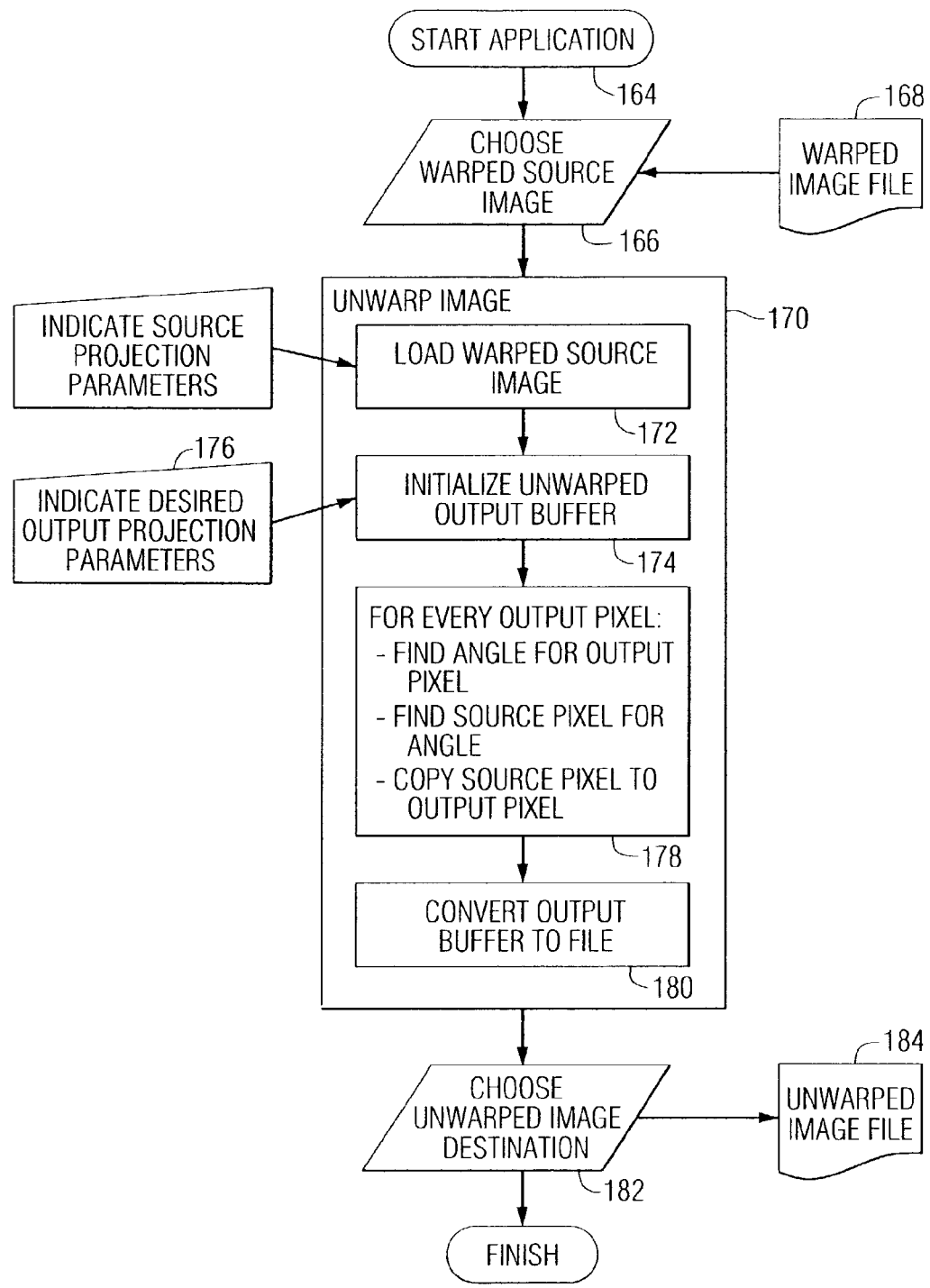
FIG. 19 is a flow diagram that illustrates a particular example of a method of the invention.

FIG. 19 is a flow diagram that illustrates a particular example of the processing method. At the start of the process, as illustrated in block 164, a warped source image is chosen as shown in block 166 from a warped image file 168. Several processes are performed to unwarp the image as shown in block 170. In particular, block 172 shows that the warped image is loaded into a buffer. The warped image buffer then includes source file pixel information and pre-determined or user-specified metadata that identifies the source image projection parameters. An unwarped output image buffer is initialized as shown in block 174. The desired output projection parameters are indicated as shown in block 176. Block 178 shows that for every output pixel, the method determines the angle for the output pixel and the corresponding source pixel for the angle. The angle can be represented as θ and φ, which are polar coordinates. The radius will always be one for spherical coordinates, since these images contain no depth information. Then the source pixel value is copied to the output pixel. After all output pixels have received a value, the output buffer is converted to an output file as shown in block 180. An unwarped image destination is chosen as shown in block 182 and the unwarped image file is loaded into the chosen destination as shown in block 184.

Using the described process, the warped source image can be converted into an image with a more traditional projection using an unwarping process. For example, it may be desirable to unwarp an equi-angular source image into an equi-rectangular projection image, where pixels in the horizontal direction are directly proportional to the pan (longitudinal) angles (in degrees) of the panorama, and pixels in the vertical direction are directly proportional to the tilt (latitudinal) angles (also in degrees) of the panorama.

The algorithm for the unwarping process determines the one-to-one mapping between pixels in the unwarped image and those in the warped image, then uses this mapping to extract pixels from the warped image and to place those pixels in the unwarped image, possibly using an interpolation algorithm for smoothness. Since the mapping between the unwarped and warped images may not always translate into integer coordinates in the source image space, it may be necessary to determine a value for pixels in between other pixels. Bi-directional interpolation algorithms (such as bilinear, bicubic, spline, or sinc functions) can be used to determine such values.

The unique shape and properties of the compensated equi-angular mirror combined with the functionality of the PhotoWarp software may substantially reduce a processing time associated with processing the pixel data into the viewable panoramic image. Specifically, since each pixel reflected by the mirror and captured by the camera corresponds to an equal angle, simple first order equations can be processed with the PhotoWarp software and used to quickly determine the angle for the output pixel and the corresponding source pixel for the angle, and the proper source pixel value can then be mapped to the output pixel of the viewable panoramic image. These pixels reflected by such a compensated equi-angular mirror may be referred to as equi-angular pixels, and such a mapping scheme may be referred to as a radially linear mapping scheme. This simple radially linear pixel mapping substantially reduces the processing time and the complexity of the software code needed to produce a viewable panoramic image by as much as 20 to 40 percent when compared to panoramic imaging systems that do not utilize a mirror that provides radially linear mapping between the source pixels and the output pixels. This improvement in processing time is achieved by the reduced number of calculations that must be performed on every pixel in the image.

As an example, radially linearly mapping an equi-angular source image to an equi-rectangular destination image can be quickly achieved by pre-calculating sine and cosine values for a particular pan angle in the output image, then proceeding linearly along the radius of the source image to produce columns of destination pixels. Only two multiply-add computations would be needed for each pixel in the output image, and the system memory would typically not need to be accessed to perform these calculations. A non-radially linear source mapping would require either more calculations for each pixel, or would need to generate a lookup table for radial pixels, which on modern processors can incur a performance penalty for accessing system memory.

In another embodiment, image processing may be performed using a software application, hereinafter called VideoWarp, that can also be used on various types of computers, such as Mac OS 9, Mac OS X, and Windows platforms. This software may be combined with a graphics hardware device, such as a 3-D graphics card commonly known in the art, to process images captured with a panoramic imaging device, such as the device 12 of FIG. 1, and produce panoramic images suitable for viewing. In this particular embodiment, the combination of the VideoWarp software and the graphics hardware device provide the appropriate resources typically required for processing video.

Typically, video is made up of a plurality of still images displayed in sequence. The images are usually displayed at a high rate speed, sufficient to make the changing events in the individual images appear fluid and connected. A minimum image display rate is often approximately 30 images per second, although other display rates may be sufficient depending on the characteristics of the equipment used for processing the images. While software alone may be sufficient for processing the often one million or more pixels needed for a viewable panoramic image and displaying the viewable panoramic image, software alone is typically not capable of calculating and displaying the one million or more pixels of a viewable panoramic image 30 or more times a second in order to produce a real time video feed. Therefore, in one embodiment the VideoWarp software may be used in conjunction with a graphics hardware device to process panoramic video that can be viewed and manipulated in real time, or recorded for later use, such as on a video disc (e.g. as a QuickTime movie) for storage and distribution.

VideoWarp preferably uses a layered structure that maximizes code reuse, cross-platform functionality and expandability. The preferred embodiment of the software is written in the C and C++ languages, and uses many object-oriented methodologies. The main components of the application are the user interface, source, model, projection and renderer.

The VideoWarp Core refers to the combination of the source, model, projection and renderer classes that together do the work of the application. The interface allows users to access this functionality.

The Source component manages and retrieves frames of video data from a video source. Source is an abstract class which allows the rendering of panoramic video to be independent of the particular source chosen for display. The source can be switched at any time during the execution of VideoWarp. The source is responsible for communicating with any video source devices (when applicable), retrieving frames of video, and transferring each frame of video into a memory buffer called a texture map. The texture map may represent image data in memory in several ways. In one embodiment, each pixel may be represented by a single Red, Green and Blue channel (RGB) value. In another embodiment, pixel data may be represented by luminance values for each pixel and chroma values for a group of one or more pixels, which is commonly referred to in the art as YUV format. The source may use the most efficient means possible to represent image data on the host computer system to achieve maximum performance and quality. For example, the source will attempt to use the YUV format if the graphics hardware device appears to support the YUV format. More than one source may be utilized at any given time by the renderer to obtain a more complete field-of-view.

A source may retrieve its video data from a video camera attached to the host computer, either through an analog to digital converter device to digitize analog video signals from a video camera, or through a direct digital interface with a digital camera (such as a DV or IIDC camera connected through an IEEE-1394 bus), or a digital camera connected through a camera link interface. Additionally, the source may retrieve video data from a tape deck or external storage device made to reproduce the signals of a video camera from a recording. The source may also retrieve video data from a prerecorded video file on a computer disk, computer memory device, CD-ROM, DVD-ROM, computer network or other suitable digital storage device. The source may retrieve video data from a recorded Digital Video Disc (DVD). The source may retrieve video data from a streaming video server over a network or Internet. Additionally, the source may retrieve video data from a television broadcast.

Figure 20:
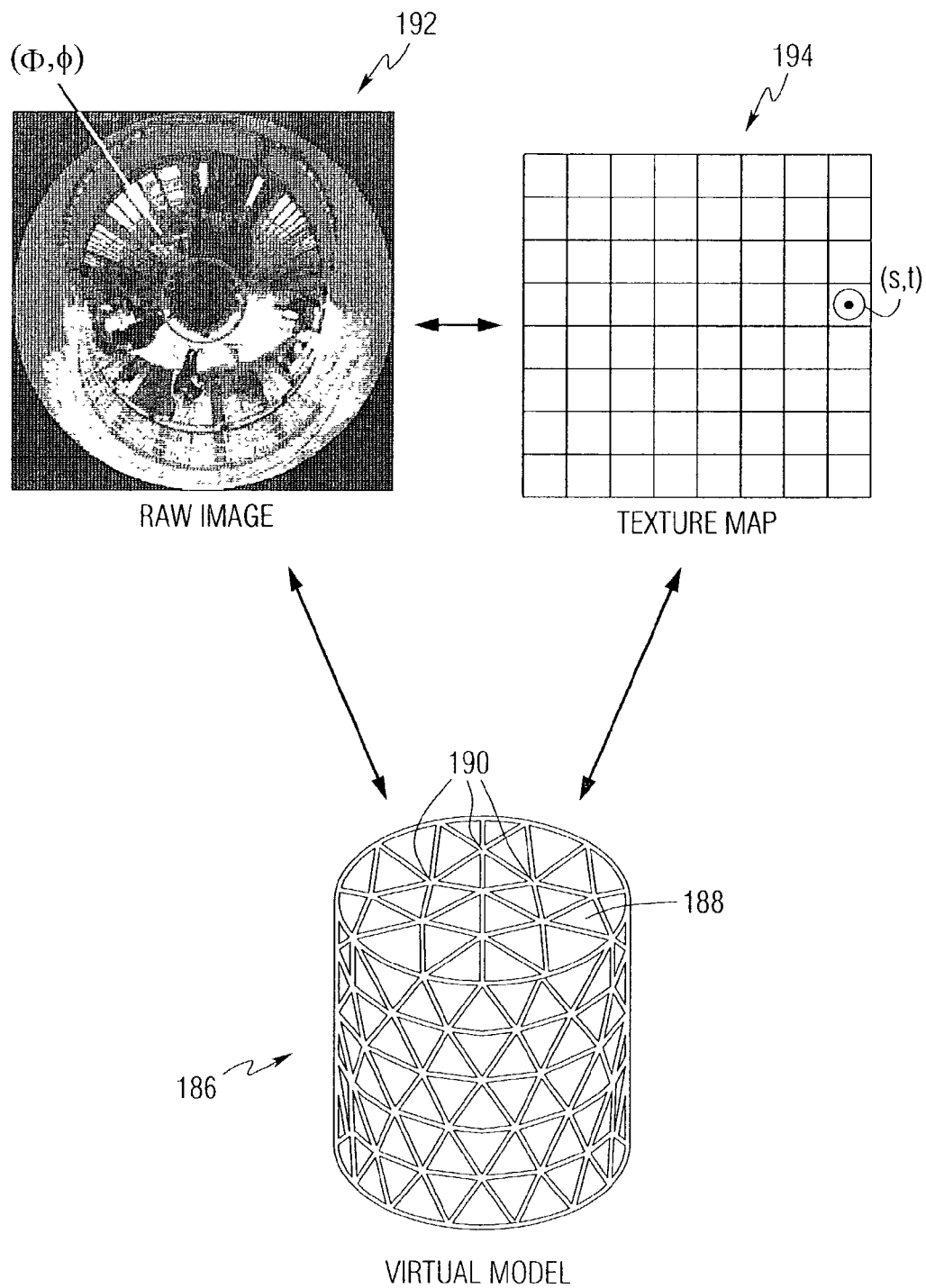
FIG. 20 is a schematic diagram illustrating how vertices and texture map coordinates may be used to produce a virtual model in accordance with an embodiment of the present invention.

The model component is responsible for producing vertices for a virtual three-dimensional model. FIG. 20 illustrates such a virtual model 186, which can be represented by triangles 188 grouped together to form the geometry of the virtual model. The intersections of the triangles 188 are the vertices 190, and such vertices in the virtual model are points corresponding to space vectors in the raw or "warped" image 192 of FIG. 20. These vertices 190 produced by the model component essentially form a "skeleton" of the virtual model. The virtual model will typically be a representative model of the final viewable panoramic image. In this embodiment the vertices 190 of the virtual model 186 will remain constant even though the scene may be changing. This is because even though the scene may be changing, the relationship between the space vectors of the raw image and the corresponding points on the virtual model will be the same provided the model is not changed. The fact that the vertices may remain constant is an advantage, as the vertices may be determined once, and then used to produce the multiple still images needed to create the panoramic video. This will save on processor resources and may reduce the amount of time and latency associated with processing and displaying the video.

Model is an abstract class which allows the rendering of panoramic video to be independent of the particular model chosen for display. The model can be switched at any time during the execution of VideoWarp. If the model is switched, the vertices will need to be calculated again. The model may represent a cube or hexahedron, a sphere or ellipsoid, a cylinder having closed ends, an icosahedron, or any arbitrary three-dimensional model. The model preferably will encompass a 360 degree horizontal field of view from a viewpoint in the interior, and a vertical field of view between 90 degrees and 180 degrees. The model may encompass a lesser area should the coverage of the source video be less than that of the model, or to the boundary of the area to visible to the user. Models can be varied over time to provide transitions or animations to the user display. Transitions may be used between models to smooth or "morph" between displays that represent different views of the panoramic video to the user.

The projection component is used by the model to compute texture map coordinates for each vertex in the model. Texture map coordinates refer to a particular point or location within a source texture map, which can be represented by s and t. The projection defines the relationship between each pixel in the source texture map and a direction $(\theta, \phi)$ of the panoramic source image for that pixel. The direction $(\theta,$ φ) also corresponds to a particular vertex of the virtual model, as described above. Projection provides a function which converts the (θ, φ) coordinates provided for a vertex of the model to the corresponding s and t texture map coordinate. When the viewable image is displayed, the point (s, t) of the texture map will be pinned to the corresponding vertex, producing a "skin" over the skeleton of the model which will be used to eventually reproduce substantially the entire original appearance of the captured scene to the user. This is also illustrated in FIG. 20, where a particular point (s, t) is shown on a texture map 194 and corresponds to a direction (θ, φ) of the raw source image 192 for that pixel location (s, t), and also corresponds to a vertex of the virtual model 186. In this embodiment, provided that the camera is not moved and the mirror is securely mounted so that it does not move in relation to the camera, the texture map coordinates of the virtual model 186 will remain constant even though the scene may be changing. This is because the projection of the source image and its relationship to the model remains constant. The fact that the texture map coordinates may remain constant is an advantage, as the texture map coordinates may be determined once, and then used to produce the multiple still images needed to create the panoramic video. This will save on processor resources and may reduce the amount of time and latency associated with processing and displaying the video.

Projection is an abstract class which allows the rendering of panoramic video to be independent of the particular projection chosen to represent the source image. The parameters of the projection may be changed over time as the source video dictates. The projection itself may be changed at any time during the execution of VideoWarp. If the projection is changed, the texture map coordinates will need to be calculated again. The projection may represent an equi-angular mirror, an unrolled cylinder, an equi-rectangular map projection, the faces of a cube or other polyhedron, or any other projection which provides a 1-to-1 mapping between directional vectors (θ, φ) and texture map coordinates (s,t).

The renderer component manages the interactions of all the other components in VideoWarp. Renderer is an abstract class which allows the rendering of panoramic video to be independent of the particular host operating system, 3D graphics framework, and 3D graphics architecture. A particular renderer is chosen which is compatible with the host computer and will achieve the maximum performance. The Renderer is in use for the lifetime of the application.

At the start of the application, the renderer uses the facilities of the host operating system to initialize the graphics hardware device, often using a framework such as OpenGL or Direct3D. The renderer may then determine the initial source, model and projection to use for the session and initializes their status. Once initialized, the renderer begins a loop to display panoramic video:

1) Determine user's preferred viewing direction.
2) Set viewing direction in graphics hardware device.
3) Determine if the model needs to be changed. Re-initialize if necessary.
4) Determine if the projection needs to be changed. Re-initialize if necessary.
5) Determine if the source needs to be changed. Re-initialize if necessary.
6) Request a frame of source video from the active source.
7) Request the graphics hardware device to draw the viewable image.
8) Repeat.

The renderer may execute some of the above processes simultaneously by using a preemptive threading architecture on the host platform. This is used to improve performance and update at a smooth, consistent rate. For example, the renderer may spawn a preemptive thread that is responsible for continually retrieving new source video frames and updating the source texture map. It may also spawn a preemptive thread responsible for issuing redraw requests to the graphics hardware device at the maximum rate possible by the hardware. Additionally, the renderer may make use of the features of a host system to execute direct memory access between the source texture map and the graphics hardware device. This typically eliminates the interaction of the computer CPU from transferring the large amounts of image data, which frees the CPU to perform other duties and may greatly improve the performance of the system. The renderer may also pass along important information about the host system to the source, model and projection components to improve performance or quality. For example, the renderer may inform the source that the graphics hardware device is compatible with YUV encoded pixel data. For many forms of digital video, YUV is the native encoding of pixel data and is more space-efficient than the standard RGB pixel format. The source can then work natively with YUV pixels, avoiding a computationally expensive conversion to RGB, saving memory and bandwidth. This will often result in considerable performance and quality improvements.

Figure 21:
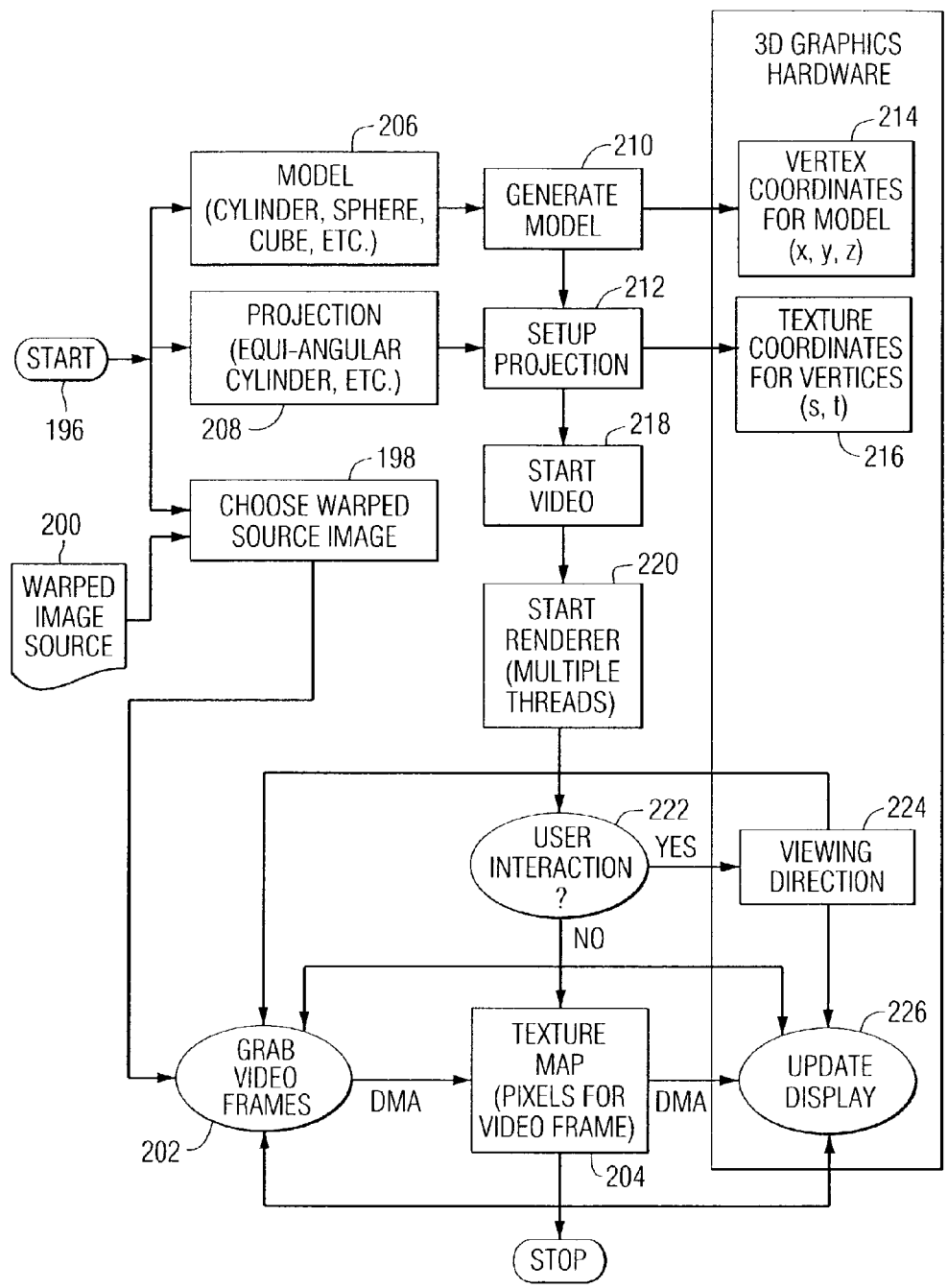
FIG. 21 is a flow diagram that illustrates a particular example of a method of the invention.

FIG. 21 is a flow diagram that illustrates a particular example of the processing method. At the start of the process, as illustrated in block 196, a warped source image is chosen as shown in block 198 from a warped image source 200. Several processes are performed to unwarp the image. In particular, block 202 shows that the warped image is "captured" by a video frame grabber, and block 204 shows that the pixel data from the source image is transferred to a texture map memory buffer as a texture map. Block 206 shows that a user or pre-determined meta-data can identify a particular virtual model to use, and block 208 shows that a user or pre-determined meta-data can identify a particular projection to use. In block 210 the vertices are produced for the virtual model, and in block 212 the projection is set up by computing the texture map coordinates for the vertices of the virtual model. Next, the virtual model is transferred to a graphics hardware device by transferring the vertex coordinates as shown in block 214 and transferring the texture map coordinates as shown in block 216. Block 218 shows that video is now ready to be displayed. In particular, block 220 shows that the renderer may spawn multiple and simultaneous threads to display the video. At block 222, the render can determine if the user has entered particular viewing parameters, such as zooming or the particular portion of the panorama to view, as shown in block 224, and instruct the hardware to make the appropriate corrections to the virtual model. Back at block 204 the renderer can make the pixel data of the current texture map from the texture map memory buffer available to the graphics hardware device, and at block 202 the renderer can instruct the software to "capture" the next video frame and map that pixel data to the texture map memory buffer as a new texture map at block 204. The graphics hardware device will use the pixel data from the texture map memory buffer to complete the virtual model, and will update the display by displaying the completed virtual model as a viewable panoramic image as shown at block 226. In one embodiment, the graphics hardware device may utilize an interpolation scheme to, "fill" in the pixels between the vertices and complete the virtual model. In this embodiment, a barycentric interpolation scheme could be used to calculate the intermediate values of the texture coordinates between the vertices. Then, a bilinear interpolation scheme could be used on the source pixels residing in the texture map to actually transfer the appropriate source pixel into the appropriate location on the model. The renderer can continue these procedures in a continuous loop until the user instructs the process to stop, or there is no longer any pixel data from the warped image source. FIG. 21 also shows that direct memory access (DMA) can be utilized if the hardware will support it. DMA can be used, for example, in allowing the texture map from the captured video frame to be directly available for the graphics hardware device to use.

The Interface layer is the part of the VideoWarp application visible to the user. It shelters the user from the complexity of the underlying core, while providing an easy to use, attractive front end for their utility. VideoWarp can provide a simple one-window interface suitable for displaying panoramic video captured with a reflective mirror optic. Specifically, VideoWarp enables the following capabilities:

Open panoramic video sources from files, attached cameras, video streams, etc.

Setting or adjusting the parameters of the source projection.

Choosing the model and display style for rendering.

Interacting with the panoramic video to choose a display view

Saving panoramic video to disk for later playback, archiving or exchange.

The implementation of the interface layer varies by host platform and operating system. The appearance of the interface is similar on all platforms to allow easy switching between platforms for users.

In some instances, the resolution of a captured source image may be so great that a single texture map may not be able to accommodate all of the pixel data from the captured image. In many instances the graphics hardware device may only allow the texture map to be a maximum size, such as 2048 by 2048 pixels, or 4096 by 4096 pixels. If an image is captured having a resolution of 8192 by 8192 pixels, the single texture map would not be able to accommodate it. In one embodiment, multiple texture maps may be created, and the texture map coordinates may be computed for the multiple texture maps. When the texture map coordinates are computed, the multiple texture maps may be considered as a "single" texture map, so that stitching effects commonly associated with multiple texture maps will not appear in the resulting viewable image or images.

The user interface component of both the PhotoWarp and VideoWarp software allows a viewer to change the viewing perspective of the resulting viewable panoramic image. In the VideoWarp context, the speed with which frames of video may be produced provides a substantial real-time update of the resulting video as the user changes the viewing perspective, without noticeable lag or latency. The viewing perspective may be altered by allowing the user to "look" up and concentrate on the top portion of the resulting viewable panoramic images, to "look" down and concentrate more on the bottom portion of the resulting viewable panoramic images, to pan around the entire 360° horizontal field of view of the resulting viewable panoramic images, as if from a stationary reference point in the captured scene, and/or to "zoom" in or out on portions of the resulting viewable panoramic images. In the VideoWarp context, the viewing perspective may be rendered by placing a "virtual" camera in the center of the model, which typically simulates a user's head and the view they would see if they were standing in the middle of the model. A user requesting a change in the viewing direction can be likened to the user altering the roll, pitch, and/or yaw of his or her head. As the roll, pitch, and/or yaw changes, the orientation of the virtual camera can be altered accordingly, thus changing the viewing perspective of the resulting viewable image or images. The user or viewer may use a mouse, a keyboard, a track ball or any other haptic device to facilitate altering the viewing perspective of the viewable panoramic images. In another embodiment, the viewer may use a head tracker coupled with a head mounted device to facilitate altering the viewing perspective of the viewable panoramic images. In this embodiment, the viewer is given the sense that he or she is standing in the center of the scene that was captured with the panoramic camera.

Figure 22:
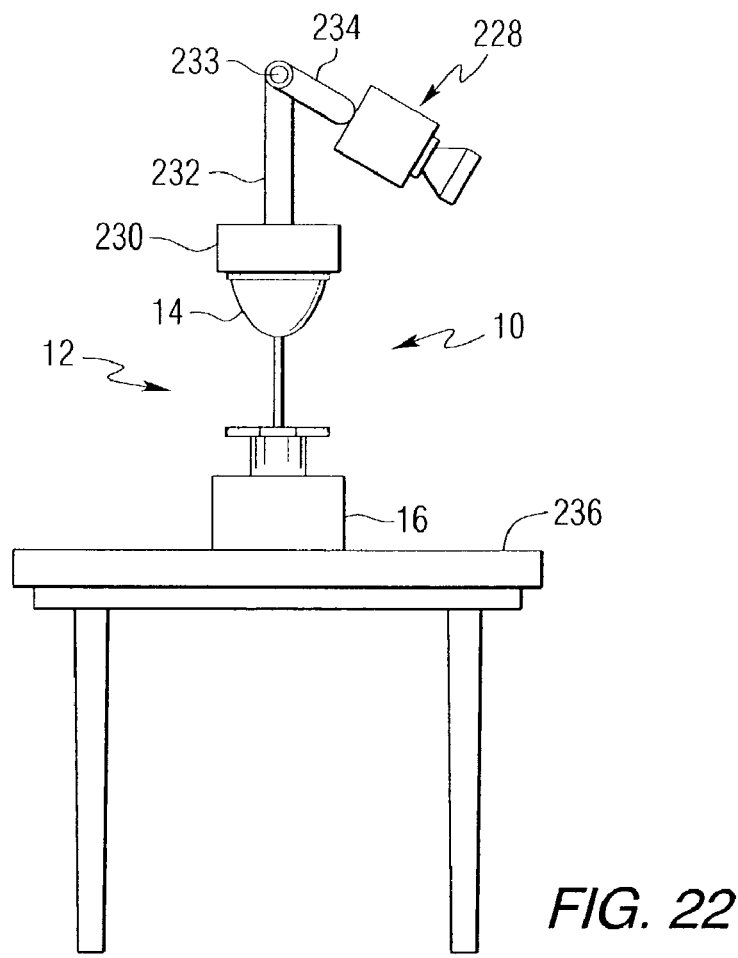
FIG. 22 is a schematic representation of a system for producing images in accordance with another embodiment of the present invention.
Figure 23:
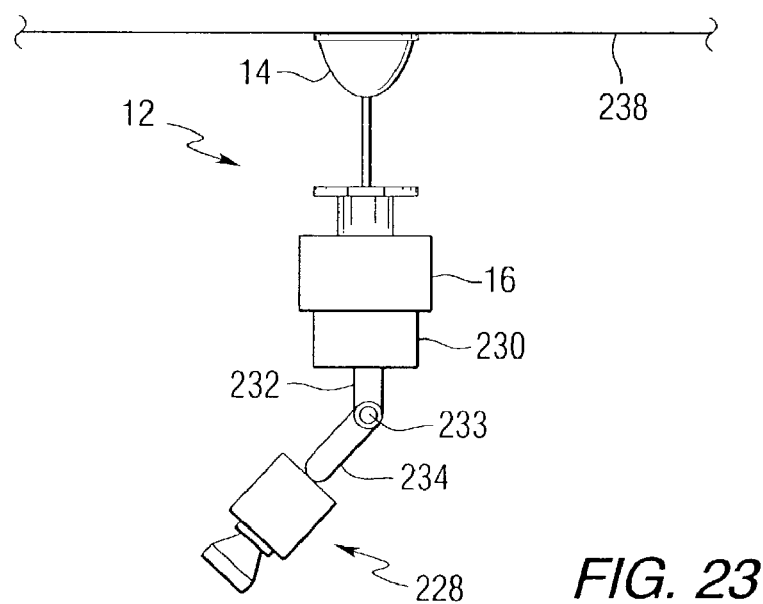
FIG. 23 is a schematic representation of a system for producing images in accordance with another embodiment of the present invention.

In a preferred embodiment of the invention, a panoramic imaging device, such as the panoramic imaging device 12 of FIG. 1, may be combined with at least one secondary camera, such as secondary camera 228 as shown in FIGS. 22–25*b*. FIG. 22 shows that the secondary camera 228 may be mounted above the mirror 14 of the panoramic imaging device 12, FIG. 23 shows that the secondary camera 228 may be mounted below the mirror 14 of the panoramic imaging device 12, FIG. 24 shows that the secondary camera 228 may be mounted adjacent to the mirror 14 of the panoramic imaging device 12, and FIGS. 25*a* and 25*b* show that the secondary camera 228 may be mounted adjacent to the camera 16 of the panoramic imaging device 12. As also illustrated in FIGS. 22–24, the secondary camera 228 may be coupled to a pan, tilt and/or zoom controller device 230 for providing the camera 228 with panning, tilting and/or zooming capabilities. For example, the controller device 230 may provide mounting arm 232 with a pivoting motion, allowing the camera 228 to pan around an axis perpendicular to the table 236 or the ceiling 238. The controller device 230 may also cause pivot 233 to rotate in a clockwise or counter-clockwise direction, thereby allowing mounting arm 234 and the camera 228 to tilt with respect to the plane of the table 236 or the ceiling 238. The camera 228 may also include a zoom lens, which may also be controlled by the controller device 230. Although not shown, it is to be understood that other means may be used to provide the secondary camera 228 with pan, tilt, and/or zoom capabilities.

The panoramic imaging device 12 and the secondary camera 228 may cooperate together to provide a user with high-resolution images of specific portions of the surrounding scene captured with the camera 16. The panoramic imaging device 12 may be used as described herein to capture a surrounding scene and to present a viewable panoramic image of that scene to the user, either as a single still image or as a series of still images displayed at an appropriate video frequency. As also described herein, the user may use a mouse, a keyboard, a track ball, or any other computer input device or haptic device to alter the viewing perspective of the viewable panoramic image or images, such as "looking" up towards the top portion of the resulting viewable panoramic image, "looking" down towards the bottom portion of the resulting viewable panoramic image, or "looking" at various portions of the entire 360° horizontal field of view of the resulting viewable panoramic image. As the user alters the viewing direction, computer software and/or hardware can instruct the secondary camera 228 to follow the user's actions, utilizing the pan, tilt, and zoom controller device 230 to move the secondary camera 228 to fixate on the portions of the surrounding scene that the user is concentrating on in the viewable panoramic image. In one embodiment, when the user desires to see a portion of the viewable panoramic image in greater detail, he or she may choose that portion of the viewable panoramic image, either by "looking" at it with a head tracker device for a set period of time, or by holding a cursor over the portion of the viewable image for a set period of time, such as with a mouse, a keyboard, track ball, or input device. This time period is completely variable, and may be set in the computer software and/or hardware. In one embodiment, an optimum period of time may be from about zero seconds to about five seconds, but other time periods may work equally as well. In another embodiment, the time period may be dependent on the speed of the pan, tilt, and zoom controller device 230 as it works to move the secondary camera 228 into position. This time period may be variable, depending on how quickly the user chooses a portion of the viewable panoramic image to view, and the amount that the secondary camera 228 must move to "catch up" to the portion of the scene that the user is interested in viewing in greater detail. In another embodiment, the user may wish to select a region of interest for the secondary camera 228 to focus upon explicitly. The user may then indicate the region of interest by clicking and dragging a rectangular selection over the image with any suitable computer input device. The computer software and/or hardware can then instruct the secondary camera 228 to move into a position to focus upon the selected region of interest, potentially adjusting the zoom of the camera to fill the approximate size of the selected region.

In a preferred embodiment, as the secondary camera 228 is moving to fixate on the portion of the scene that the user is interested in viewing, the user will only be presented with the viewable panoramic image or images while the secondary camera 228 is moving in the background. In this manner, the motion blur and dizziness associated with typical pan and tilt camera systems that occurs when the user sees the images from the pan and tilt camera as it is moving will be eliminated. In this embodiment, the user is not shown the high-resolution image from the secondary camera 228 until the secondary camera has stopped moving and is fixated on the appropriate portion of the scene.

Once the user has "chosen" the portion of the viewable panoramic image to view in greater detail, the secondary camera 228 may continue to move until the secondary camera is in an appropriate position to capture that portion of the scene corresponding to the portion of the viewable panoramic image that the user has chosen. In one embodiment, the panoramic imaging device 12 and the secondary camera 228 may be positioned so that the pixel data of the images of the respective cameras can be registered. This essentially means that for a piece of pixel data in the image captured by the secondary camera 228, there will preferably be a corresponding piece of pixel data in the panoramic image of the scene captured by the panoramic imaging device 12. In this embodiment, once the user has "chosen" a portion of the viewable panoramic image to view in greater detail, computer software and/or hardware may be used to monitor the pixel data captured from the secondary camera 228 as it is moving into position, and the software and/or hardware can continue to instruct the pan, tilt, and zoom controller device 230 to continue to move the secondary camera 228 until the pixel data of the image or images being captured by the secondary camera 228 registers with the pixel data of the portion of the viewable panoramic image that the user wishes to view in greater detail.

In another embodiment, there may be times when the pixel data of the image captured with the panoramic imaging device 12 may not correspond to the pixel data of the image captured by the secondary camera 228. In this embodiment, the pixel data of the image captured by the secondary camera 228 may be transformed with computer software and/or hardware so that the pieces of pixel data of the image captured by the secondary camera can be registered with pieces of pixel data in the image captured by the panoramic imaging device. As an example, if the viewing perspective of the two cameras is not identical, it may be desirable to perform a "morphing" operation on the image captured with the secondary camera to make it conform more accurately to the corresponding features in the viewable panoramic image. There are several such morphing techniques known in the art. For example, the software and/or hardware may perform a "corner detection" algorithm on both images, form a correspondence between the corners detected in each image based on a proximity search, and then transform the image data between the matched corners of the secondary image to correspond to the positions in the panoramic image, distorting the image to fit as necessary.

Once the user has chosen the portion of the viewable panoramic image to view in greater detail, and the secondary camera 228 has captured the corresponding portion of the surrounding scene, computer software and/or hardware may be utilized to cooperatively display the viewable panoramic image and the portion of the surrounding scene captured by the secondary camera 228. In one embodiment, the viewable panoramic image may be displayed using the techniques described herein, the computer software and/or hardware may overlay the portion of the scene captured by the secondary camera 228 onto the appropriate corresponding portion of the viewable panoramic image, and the viewable panoramic image and the overlaid portion of the scene may be displayed to the user in a simultaneous fashion. The result will typically be that the user will experience an effect such that the portion of the viewable panoramic image he or she is interested in viewing in greater detail becomes much sharper and clearer.

In one embodiment, if a software application such as PhotoWarp is being used to capture and display individual viewable panoramic images, the PhotoWarp software may also be used for overlaying the portion of the scene captured by the secondary camera 228 onto the corresponding portion of the viewable panoramic image and displaying the viewable panoramic image and the overlaid portion of the scene. For example, the appropriate projective mapping for the image captured with the secondary camera 228 may be added to the source of the panoramic image "above" the primary panoramic image. The PhotoWarp engine will overlay the image captured with the secondary camera 228 over the corresponding area of the panoramic image, yielding potentially higher resolution in the output image for that particular region. The projective mapping for the image of the secondary camera 228 may be manipulated to perform the "morphing" operation discussed herein to bring the view in line with the corresponding panoramic image, if needed.

In another embodiment, if a software application such as VideoWarp is being utilized to capture and display multiple viewable panoramic images at a suitable video frequency rate, the VideoWarp software may also be utilized to overlay the portion of the scene captured by the secondary camera 228 onto the corresponding portion of the viewable panoramic image, and display the viewable panoramic image and the overlaid portion of the scene together. For example, the projective mapping for the image captured with the secondary camera 228 can be defined and associated with the video source from the secondary camera (this can be the same projective mapping used in PhotoWarp). The VideoWarp engine can then instruct the graphics hardware to overlay this secondary image atop the viewable panoramic image using a multi-textured surface for the model. Here, the traditional set of texture coordinates applied to the vertices of the model is augmented by a secondary set of texture coordinates generated by the projective mapping of the image from the secondary camera.

In one embodiment, computer software and/or hardware may blend pixel data at the border of the overlaid portion of the scene with the corresponding pixel data of the viewable panoramic image in order to account for any discontinuities that may appear when the overlaid portion of the scene and the viewable panoramic image are displayed together.

In another embodiment as shown in FIG. 24, the secondary camera 228 may be movably positioned at a plurality of locations adjacent to the mirror 14. For example, a ball bearing race or other track assembly 240 may be mounted around the perimeter of mirror 14 as shown in FIG. 24. In this embodiment, the secondary camera 228 and the pan, tilt, and/or zoom controller device 230 may be movably mounted to the track 240 with any suitable means for moving the camera 228 along the track 240, such as a motor and/or a gear assembly (not shown). This motor and/or gear assembly may be located, for example, within the pan, tilt, and zoom controller device 230. Alternatively, the camera 228 may be movably positioned at a plurality of locations adjacent to the camera 16 as shown in FIGS. 25a and 25b. For example, a track assembly consisting of an inner track 235a and outer tracks 235b and 235c may be mounted around the perimeter of camera 16 as shown in FIGS. 25a and 25b. In this embodiment, the secondary camera 228 may be movably mounted between track 235a and tracks 235b and 235c, and may move within the tracks by any suitable means, such as a motor and/or a gear assembly (not shown). This motor and/or gear assembly may be located, for example, within the inner track 235a. Additional cameras may also be mounted adjacent to the mirror 14 or the camera 16.

In this embodiment, the secondary camera 228 may be positioned so that it can focus on various portions of the mirror 14 and capture portions of the image of the surrounding scene reflected by the mirror. As the user uses an input device to view different portions of the displayed viewable panoramic image as discussed herein, the secondary camera 228 can move around the mirror 14 or camera 16 and perform pan, tilt, and/or zoom operations in order to "keep up" with the user. When the user has chosen a portion of the viewable panoramic image to view in greater detail, as discussed herein, the secondary camera 228 may continue to move until it is in the appropriate position to capture that corresponding portion of the image of the scene reflected by the mirror, and then proceed to capture that portion of the image of the scene reflected by the mirror. The portion of the image of the scene captured by the secondary camera 228 and the viewable panoramic image may then be cooperatively displayed to the user as discussed herein.

In this embodiment, the portion of the image of the scene captured by the secondary camera 228 must typically be unwarped before it can be presented to the user. In one embodiment, the PhotoWarp software may be used to unwarp the portion of the image of the scene captured by the secondary camera in a fashion similar to the unwarping and displaying of viewable panoramic images. In this embodiment, a process similar to the process shown in FIG. 19 may be utilized. For example, the pixel data of the portion of the image of the scene captured by the secondary camera 228 may be loaded into a buffer. An output image buffer may then be initialized, and the desired output projection parameters may be supplied, which will typically be the same output projection parameters used for displaying the viewable panoramic image. For every output pixel, the angle for the output pixel and the corresponding source pixel for that angle may be determined, and a source pixel value may be copied to the output pixel. After all output pixels have received a value, the output buffer or the pixel data in the output buffer may be converted to an output file, and the pixel data in the output buffer or the output file may be overlaid onto the corresponding portion of the viewable panoramic image, and may be displayed to the user simultaneously with the viewable panoramic image. The "morphing" operation discussed herein may also be utilized to bring the selected portion of the reflected image in line with the corresponding panoramic image, if needed.

In another embodiment, the VideoWarp software described above may be used to unwarp the portion of the image of the scene or scenes captured by the secondary camera 228. In this embodiment, a graphics hardware device may be used which supports multi-texturing. A second texture map memory buffer may be created, and the pixel data from the portion of the image of the scene captured by the secondary camera may be transferred to this second texture map memory buffer. A plurality of vertices for a model of the portion of the captured image may be produced, and a set of texture map coordinates may be computed for each of the vertices of the model, wherein the texture map coordinates represent pieces of pixel data in the second texture map memory buffer that correspond to the pieces of pixel data in the portion of the image of the scene. In this embodiment, as the secondary camera 228 moves around the mirror 14 and captures different portions of the reflected image of the scene, the texture map coordinates for the vertices of the model will typically need to be recomputed each time a new portion of the reflected scene is captured by the secondary camera. The second model, including the vertices and the texture map coordinates, may then be transferred to the graphics hardware device, and the graphics hardware device may utilize the pixel data from the second texture map memory buffer to complete the model and cooperatively display the completed model as a high-resolution viewable portion of the scene along with the viewable panoramic image. The "morphing" operation discussed herein may also be utilized to bring the selected portion of the reflected image in line with the corresponding panoramic image, if needed.

In this embodiment, the secondary camera 228 should be made as small as possible, since it is located adjacent to the mirror 14 and/or camera 16 and will typically appear in the resulting viewable panoramic image. In one embodiment, an interpolation scheme may be utilized to remove the image of the secondary camera 228 from the resulting viewable panoramic image, such as the method and apparatus disclosed in co-pending commonly owned U.S. patent application Ser. No. 10/081,837 Filed Feb. 22, 2002, which is hereby incorporated by reference.

Figure 26:
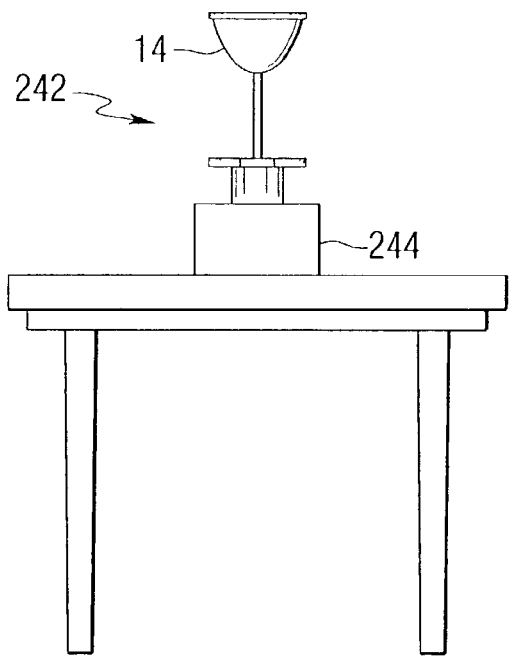
FIG. 26 is a schematic representation of a system for producing images in accordance with another embodiment of the present invention.

In another embodiment, a panoramic imaging device 242 may be utilized as shown in FIG. 26. In this embodiment, the camera 244 may include an active-pixel image sensor such as a complementary metal-oxide semiconductor (CMOS) sensor. Such active-pixel image sensors include both the photo detector and the read-out amplifier as part of each pixel. This typically allows the integrated charge to be converted into a voltage inside the pixel, and such a voltage can be addressed by a typical column and row addressing scheme. The availability of such an addressing scheme allows the CMOS camera to have windowing capabilities, which means that the CMOS camera can incorporate electronic pan, tilt, and/or zoom functions. In other words, the CMOS camera may be instructed to capture the entire image of the scene reflected by the panoramic mirror 14, or the CMOS camera may be instructed to only capture a portion of the surrounding scene reflected by the panoramic mirror 14. The features of the CMOS camera typically allow instantaneous switching between the capture of the entire scene reflected by the mirror 14 and capture of a specific portion of the image of the scene reflected by the mirror 14.

In this embodiment, the CMOS camera 244 may initially capture an entire image or images of the scene reflected by the mirror 14 and present the surrounding scene to the user as a viewable panoramic image by utilizing unwarping software, such as the PhotoWarp or VideoWarp software described herein. As also described herein, the user may then "choose" a portion of the viewable panoramic image to view in greater detail. Computer hardware and/or software may then utilize the windowing capabilities of the CMOS camera 244 and instruct the CMOS camera to display only that portion of the panoramic image reflected by the mirror 14 that the user has indicated an interest in. This portion of the viewable panoramic image reflected by the mirror 14 will also typically need to be unwarped or processed into a viewable image using unwarping software, such as the PhotoWarp or VideoWarp software described herein. The user will then be presented with this portion of the viewable panoramic image, and the portion will typically have a high resolution, since all of the available resources of the CMOS camera are now being utilized to display a relatively small amount of pixels in contrast to the very large amount of pixels displayed when the entire viewable panoramic image is presented.

In one embodiment of the present invention, a target apparatus, such as a fixed target, may be provided that attaches to the base of a mirror, such as the mirror 14 of the system 10. The plane of the target apparatus may be placed substantially perpendicular to the optical axis of the camera, and may be placed behind the mirror at such a distance as to not obscure useful panoramic image data.

Figure 27:
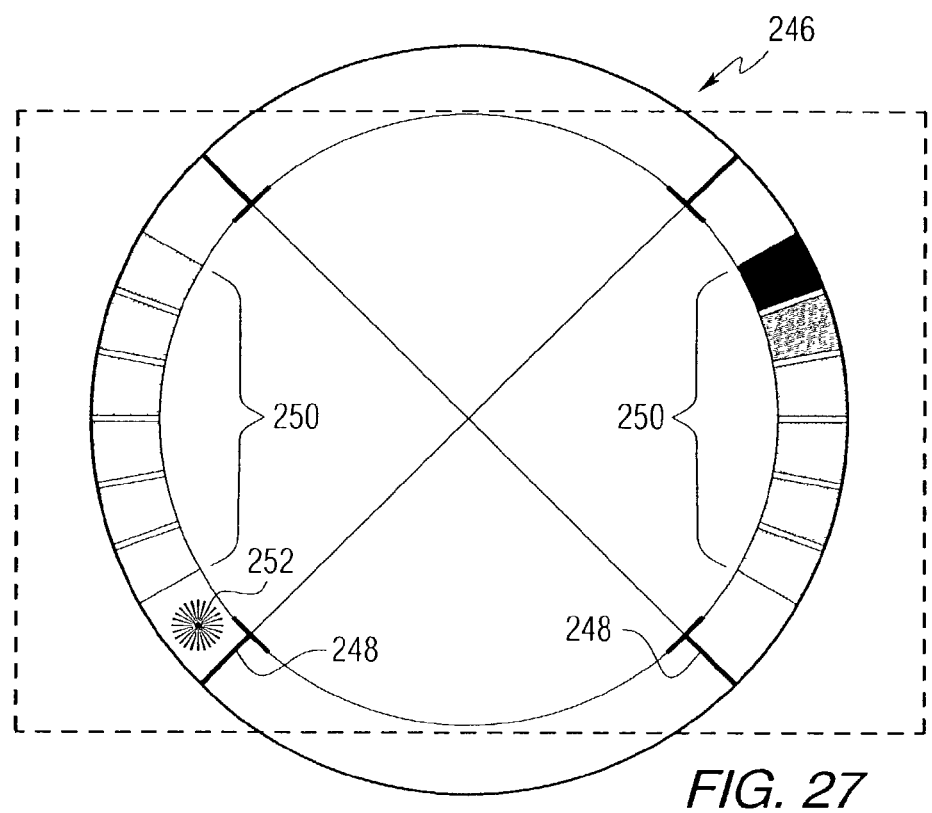
FIG. 27 is a schematic representation of a target apparatus in accordance with an embodiment of the present invention.

FIG. 27 shows such a target apparatus 246. The target may be made from an opaque material, or a semi-transparent or translucent material, and may contain one or more target elements, which may be used either by a human operator or a computer software application or other computer processing means to describe quantitative aspects of the image at the time the photograph is taken. Such target elements can be identified, read, and processed by a human operator, a computer software application, or any other suitable processing means. The target apparatus may have extended portions, which present certain target elements at more appropriate focal distances for their application. The target apparatus may be of any shape that is suitable for use with the specific mirror and camera arrangement being used, such as square, rectangular, or circular. The target apparatus may be placed far enough behind the mirror to be absent from the mirror's reflection when viewed from the camera. When photographed, at least a portion of the target will typically appear in part of the captured image not occupied by the image reflected by the mirror.

The target apparatus may include as target elements a barcode or other indicia containing parameters describing the shape of the panoramic mirror; a series of marks for determining the center and the radius of the mirror, such as perpendicular marks drawn on radial lines outwards from the center of the mirror, marks drawn tangent to the edge of the mirror, or marks comprising a combination of perpendicular marks drawn on radial lines outwards from the center of the mirror and marks drawn tangent to the edge of the mirror such as the marks 248 shown in FIG. 27; a series of shaded blocks for correcting the luminance and the white balance of the image, such as the blocks 250 shown in FIG. 27; and focusing stars that can be placed at the appropriate distances from the camera's lens to match ideal focus lengths for the particular mirror being used, such as focus star 252 shown in FIG. 27.

In one embodiment, the pixel data of an image of a captured surrounding scene, pixel data of a portion of the scene captured by the secondary camera 228, and/or pixel data of a portion of the image reflected by the mirror and captured by the secondary camera may be transferred to a server computer for processing in a client-server computer network, as disclosed in copending commonly owned U.S. patent application Ser. No. 10/081,433 filed Feb. 22, 2002, which is hereby incorporated by reference. Such processing may include, for example, converting the raw 2-dimensional array of pixels captured with the panoramic imaging device into an image suitable for viewing, converting the portion of the image reflected by the mirror and captured by the secondary camera into an image suitable for viewing, and/or overlaying the portion of the scene captured by the secondary camera or the viewable portion of the image of the scene captured by the secondary camera onto the corresponding portion of the viewable panoramic image to display the viewable image and the overlayed portion of the scene.

Figure 28:
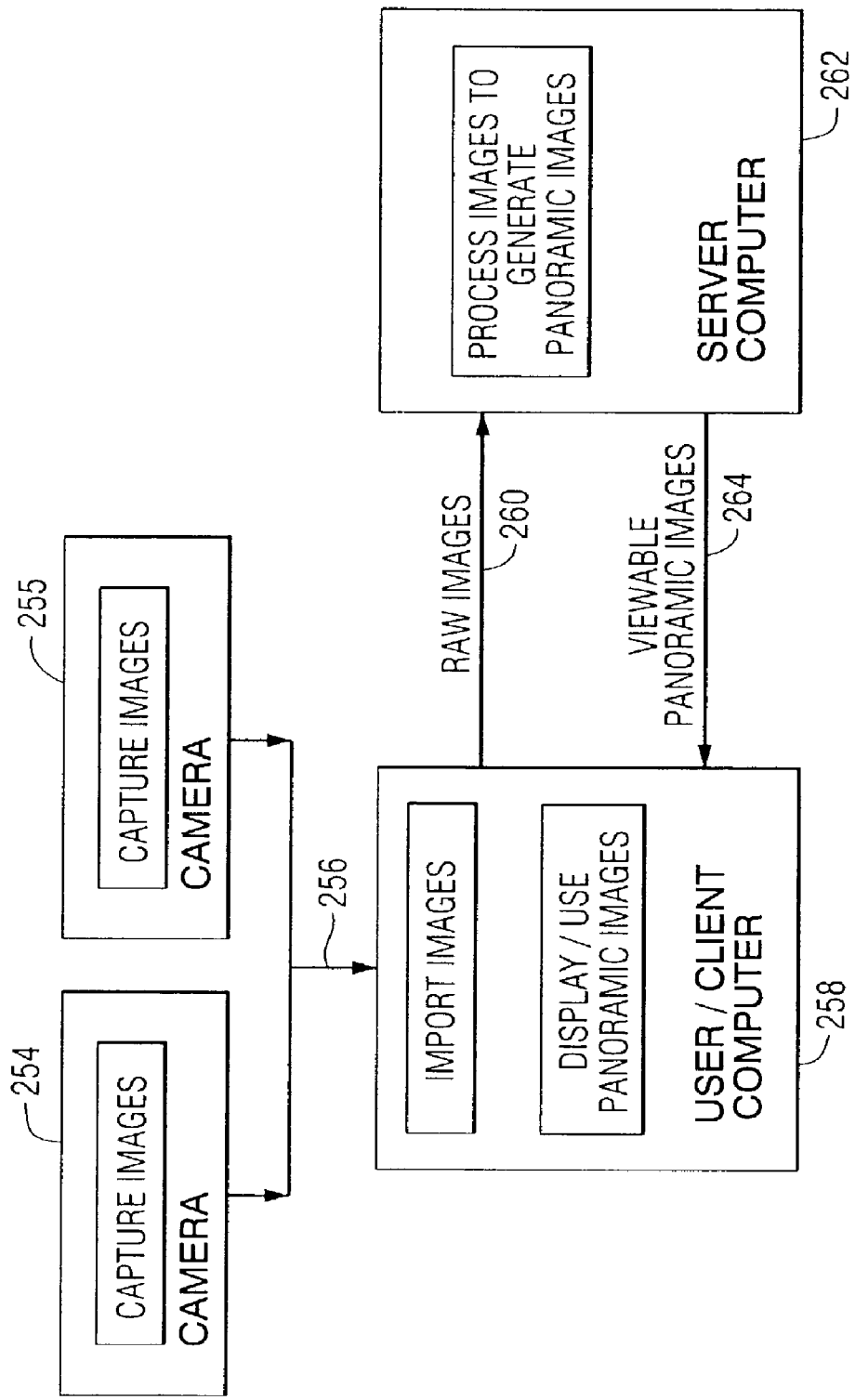
FIG. 28 is a functional block diagram that illustrates a particular example of a method of the invention.

FIG. 28 illustrates an embodiment of the invention for generating a panoramic image using client-server architecture. Specifically, one or more cameras, such as camera 254 and/or camera 255, may be used for capturing a raw image or a portion thereof. These raw images are then imported or transmitted, as illustrated at 256, from the cameras to a user or client computer 258. The raw images may be downloaded from the camera 254 to the client computer 258 by a physical connection between the camera 254 and the client computer 258, by storing the captured images on a recording medium and then the client computer 258 reading the data from the recording medium, or by a wireless transmission from the camera 254 to the client computer 258.

Once the raw photographic images are resident on the client computer 258, the images are transmitted, as illustrated at 260, to a server computer 262. The images may be transmitted from the client computer 258 to the server computer 262 using, for example, an Internet connection therebetween, a wireless connection, a phone line, or other suitable networking medium. Furthermore, the images may be transmitted using various network protocols, including e-mail, File Transfer Protocol (FTP), Hypertext Transfer Protocol (HTTP), or other suitable networking protocols.

Once the raw images have been transmitted to the server computer 262 and are resident thereon, the server computer 262 may process the raw photographic image to obtain a viewable panoramic image and/or may process portions of the scene captured by the secondary camera or portions of the image reflected by the mirror and captured by the secondary camera as described herein. Such processing may be accomplished with the PhotoWarp software and/or the VideoWarp software in combination with a graphics hardware device, as previously described herein. The processing on the server computer may also include evaluating information obtained from the target apparatus 246 (FIG. 27) and adjusting the raw image accordingly, as previously described herein.

Once the raw image has been processed, for example, to obtain a corresponding viewable panoramic image, the panoramic image may then be transmitted, as illustrated at 264, back to the client computer 258. The panoramic image may be transmitted from the server computer 262 to the client computer 258 in a similar manner as described herein for transmitting the raw images from the client computer 258 to the server computer 262. Once the panoramic images have been transmitted back to the client computer 258 and are resident thereon, a user may then display, view and/or use the processed panoramic images as desired. The client computer 258 may have installed thereon, software capable of viewing the panoramic images, such as Quicktime VR software available from Apple Computer, Inc.

Such a client server embodiment may include several variations. For example, a processed viewable panoramic image may be transmitted to an additional viewing computer or web server, rather than being transmitted back to the client computer 258. Alternatively, rather than transmitting the captured images from the cameras to a user or client computer as illustrated in FIG. 28, the raw images may be transmitted directly to a server computer. This transmission may be performed by utilizing cameras, such as a digital cameras, with the capability to transmit the images over a network using, for example, a wireless connection or a landline network. In another embodiment, the server computer may be capable of processing the raw images to obtain a viewable panoramic image, and may also be configured to allow the panoramic image to be viewed directly thereon or to place the processed panoramic image on a network for viewing by a remote computer. In addition, such a viewing/server computer may be configured to have the panoramic image embedded in a web page for viewing on a computer network.

In another embodiment of the invention, the ability to generate still panoramic images and/or panoramic video having multiple perspective views for different users at the same time is made available. In this embodiment, multiple pan, tilt, and zoom cameras may also be used in the system, and the different users may each be able to "choose" different portions of the viewable panoramic images to view in greater detail. This may be accomplished by rendering images with different viewing directions. Utilizing a client-server situation as described above, multiple users can elect to view different portions of the captured surrounding scene. Each user may independently alter the viewing perspective of the panoramic image they are viewing. Each user may also choose different portions of the panoramic image to view in greater detail, and the multiple pan and tilt cameras can capture the different portions of the surrounding scene and/or the panoramic image reflected by the mirror, and present those portions to the respective users. The speed realized with the PhotoWarp software or the combination of the VideoWarp software and the graphics hardware device can provide panoramic images or video streams having multiple views being requested by multiple users, and with multiple portions of the panoramic images presented in high detail, with almost no loss of performance and very little latency. In this embodiment, the images could be processed on the client side and then transferred to the server for viewing.

Although the present invention has been primarily described utilizing a compensated equi-angular mirror, it is to be understood that an equi-angular mirror, a parabolic shaped mirror, a hyperbolic shaped mirror, a spherical shaped mirror, or any other convex shaped mirror may be used in the system, and these mirrors may or may not be combined with lenses of various types. Additionally, multiple mirrors may be combined in particular configurations, which may increase the resolution and/or available field of view of the resulting image or images. Such uses are within the scope of the present invention.

Although the panoramic imaging system of the present invention has been primarily described as using a computer system combined with software to process and produce images, it is to be understood that a dedicated hardware system or other embedded computing device may also be used, and is within the scope of the present invention.

Whereas particular embodiments of this invention have been described above for purposes of illustration, it will be evident to those skilled in the art that numerous variations of the details of the present invention may be made without departing from the invention as defined in the appended claims.

The invention of claimed is:

1. A system for processing images, the system comprising:
   a mirror for reflecting an image of a scene;
   a mounting assembly for mounting the mirror on an axis, wherein the mirror includes a convex reflective surface defined by rotating around the axis: an equi-angular shape or a compensated equi-angular shape;
   a first camera for capturing the image reflected by the mirror;
   at least one secondary camera for capturing a portion of the scene;
   means for mapping pixel data of the image captured by the first camera into a viewable image; and
   means for cooperatively displaying the viewable image and the portion of the scene captured by the at least one secondary camera.

2. The system of claim 1, wherein the mirror has a compensated equi-angular shape described by the equation:

$$\frac{dr}{d\left(\theta+\frac{A}{\alpha}\right)} = r\cot\left(k\tan\left(\theta+\frac{A}{\alpha}\right)+\frac{\pi}{2}\right)$$

where θ is the angle that a light ray makes with the axis as it reflects off of a point on the surface of the mirror and into the lens of the camera, r is the length of a light ray between the lens of the camera and the point on the surface of the mirror, α is a constant defining the gain, and k is a constant defined by (−1−α)/2.

3. The system of claim 1, wherein the first camera is positioned so that a lens of the camera is substantially aligned with the axis.

4. The system of claim 1, further comprising:
   a panning controller device, a tilting controller device, or a zooming controller device coupled to the at least one secondary camera.

5. The system of claim 1, wherein the at least one secondary camera is positioned: above the mirror, below the mirror, adjacent to the mirror, or adjacent to the first camera.

6. The system of claim 5, further comprising means for moveably positioning the at least one secondary camera at a plurality of locations adjacent to the mirror.

7. The system of claim 5, further comprising means for moveably positioning the at least one secondary camera at a plurality of locations adjacent to the first camera.

8. The system of claim 1, wherein the at least one secondary camera captures a portion of the image of the scene reflected by the mirror.

9. The system of claim 8, further comprising means for mapping pixel data of the portion of the image of the scene captured by the at least one secondary camera into a viewable image.

10. The system of claim 1, wherein the means for mapping the pixel data of the image captured by the first camera into a viewable image comprises:
means for retrieving a source image file including the pixel data;
a processor for creating a destination image file buffer, for mapping the pixel data of the captured image from the source image file to the destination image file buffer, and for outputting pixel data from the destination image file buffer as a destination image file; and
means for displaying a viewable image defined by the destination file.

11. The system of claim 10, wherein the processor further serves as means for:
defining a first set of coordinates of pixels in the destination image file;
defining a second set of coordinates of pixels in the source image file;
identifying coordinates of the second set that correspond to coordinates of the first set; and
inserting pixel data for pixel locations corresponding to the second set of coordinates into pixel locations corresponding to the first set of coordinates.

12. The system of claim 1, wherein the means for mapping the pixel data of the image captured by the first camera into a viewable image comprises:
means for receiving a source image including the pixel data;
a processor for creating a texture map memory buffer, for transferring the pixel data from the source image to the texture map memory buffer, for producing a plurality of vertices for a model of a viewable image, wherein the vertices are representative of one or more points corresponding to one or more space vectors of the source image, and for computing one or more texture map coordinates for each of the vertices, wherein the one or more texture map coordinates are representative of one or more pieces of pixel data in the texture map memory buffer corresponding to one or more pieces of pixel data in the source image; and
a graphics hardware device for receiving the model, including the vertices and the one or more texture map coordinates, for utilizing the pixel data to complete the model, and for displaying the completed model as a viewable image.

13. The system of claim 12, wherein the model comprises one of: a cube, a hexahedron, a sphere, an ellipsoid, a cylinder, an icosahedron, and an arbitrary three-dimensional model.

14. The system of claim 1, wherein the means for cooperatively displaying the viewable image and the portion of the scene captured by the at least one secondary camera comprises:
means for displaying the image of the scene reflected by the mirror as a viewable image;
a processor for overlaying the portion of the scene captured by the at least one secondary camera onto a corresponding portion of the viewable image; and
means for displaying the viewable image and the overlayed portion of the scene.

15. The system of claim 14, wherein the processor further serves as means for registering the pixel data of the image of the scene reflected by the mirror with pixel data of the corresponding portion of the scene captured by the at least one secondary camera.

16. The system of claim 14, wherein the processor further serves as means for blending border pixel data of the overlayed portion of the scene with the pixel data of the image captured by the first camera.

17. The system of claim 1, further comprising means for choosing the portion of the scene to be captured by the at least one secondary camera.

18. The system of claim 17, wherein the means for choosing the portion of the scene to be captured by the at least one secondary camera is: a mouse, a keyboard, a joystick, a trackball, or a head tracker device.

19. The system of claim 1, further comprising a target apparatus attached to the mirror.

20. The system of claim 1, further comprising:
means for transmitting the pixel data of the scene reflected by the mirror to a server computer;
means for transmitting pixel data of the portion of the scene captured by the at least one secondary camera to a server computer;
means for processing the pixel data of the scene reflected by the mirror on the server computer to display a viewable image; and
means for overlaying the portion of the scene captured by the at least one secondary camera onto the corresponding portion of the viewable image on the server computer to display the viewable image and the overlayed portion of the scene.

21. A system for processing images, the system comprising:
a mirror for reflecting an image of a scene;
a mounting assembly for mounting the mirror on an axis;
a first camera for capturing the image reflected by the mirror;
at least one secondary camera for capturing a portion of the image reflected by the mirror;
means for moveably positioning the at least one secondary camera at a plurality of locations adjacent to the mirror or the first camera;
means for mapping pixel data of the image captured by the first camera into a viewable image; and
means for cooperatively displaying the viewable image and the portion of the image captured by the at least one secondary camera.

22. The system of claim 21, wherein the mirror includes a convex reflective surface defined by rotating around the axis: an equi-angular shape, a compensated equi-angular shape, a parabolic shape, a hyperbolic shape, or a spherical shape.

23. The system of claim 22, wherein the mirror has a compensated equi-angular shape described by the equation:

$$\frac{dr}{d\left(\theta + \frac{A}{\alpha}\right)} = r\cot\left(k\tan\left(\theta + \frac{A}{\alpha}\right) + \frac{\pi}{2}\right)$$

where $\theta$ is the angle that a light ray makes with the axis as it reflects off of a point on the surface of the mirror and into the lens of the camera, r is the length of a light ray between the lens of the camera and the point on the surface of the mirror, α is a constant defining the gain, and k is a constant defined by (−1−α)/2.

24. The system of claim 21, wherein the first camera is positioned so that a lens of the camera is substantially aligned with the axis.

25. The system of claim 21, further comprising:
a panning controller device, a tilting controller device, or a zooming controller device coupled to the at least one secondary camera.

26. The system of claim 21, wherein the means for mapping the pixel data of the image captured by the first camera into a viewable image comprises:
means for retrieving a source image file including the pixel data;
a processor for creating a destination image file buffer, for mapping the pixel data of the captured image from the source image file to the destination image file buffer, and for outputting pixel data from the destination image file buffer as a destination image file; and
means for displaying a viewable image defined by the destination file.

27. The system of claim 26, wherein the processor further serves as means for:
defining a first set of coordinates of pixels in the destination image file;
defining a second set of coordinates of pixels in the source image file;
identifying coordinates of the second set that correspond to coordinates of the first set; and
inserting pixel data for pixel locations corresponding to the second set of coordinates into pixel locations corresponding to the first set of coordinates.

28. The system of claim 21, wherein the means for mapping the pixel data of the image captured by the first camera into a viewable image comprises:
means for receiving a source image including the pixel data;
a processor for creating a texture map memory buffer, for transferring the pixel data from the source image to the texture map memory buffer, for producing a plurality of vertices for a model of a viewable image, wherein the vertices are representative of one or more points corresponding to one or more space vectors of the source image, and for computing one or more texture map coordinates for each of the vertices, wherein the one or more texture map coordinates are representative of one or more pieces of pixel data in the texture map memory buffer corresponding to one or more pieces of pixel data in the source image, and
a graphics hardware device for receiving the model, including the vertices and the one or more texture map coordinates, for utilizing the pixel data to complete the model, and for displaying the completed model as a viewable image.

29. The system of claim 28, wherein the model comprises one of: a cube, a hexahedron, a sphere, an ellipsoid, a cylinder, an icosahedron, and an arbitrary three-dimensional model.

30. The system of claim 21, wherein the means for cooperatively displaying the viewable image and the portion of the image captured by the at least one secondary camera comprises:
means for displaying the image of the scene reflected by the mirror as a viewable image;
means for mapping pixel data of the portion of the image captured by the at least one secondary camera into a viewable portion of the image;
a processor for overlaying the viewable portion of the image captured by the at least one secondary camera onto a corresponding portion of the viewable image; and
means for displaying the viewable image and the overlayed viewable portion of the image.

31. The system of claim 30, wherein the processor further serves as means for registering the pixel data of the image of the scene reflected by the mirror with pixel data of the corresponding portion of the image captured by the at least one secondary camera.

32. The system of claim 30, wherein the processor further serves as means for blending border pixel data of the overlayed viewable portion of the image with the pixel data of the image captured by the first camera.

33. The system of claim 21, further comprising means for choosing the portion of the image of the scene to be captured by the at least one secondary camera.

34. The system of claim 33, wherein the means for choosing the portion of the image of the scene to be captured by the at least one secondary camera is: a mouse, a keyboard, a trackball, a joystick, or a head tracker device.

35. The system of claim 21, further comprising a target apparatus attached to the mirror.

36. The system of claim 30, further comprising:
means for transmitting the pixel data of the scene reflected by the mirror to a server computer;
means for transmitting pixel data of the portion of the image of the scene captured by the at least one secondary camera to a server computer;
means for processing the pixel data of the scene reflected by the mirror on the server computer to display a viewable image;
means for processing the pixel data of the portion of the image of the scene captured by the at least one secondary camera on the server computer into a viewable portion of the image; and
means for overlaying the viewable portion of the image of the scene captured by the at least one secondary camera onto the corresponding portion of the viewable image on the server computer to display the viewable image and the overlayed portion of the viewable image of the scene.

37. A system for processing images, the system comprising:
a mirror for reflecting an image of a scene;
a mounting assembly for mounting the mirror on an axis, wherein the mirror includes a convex reflective surface defined by rotating around the axis: an equi-angular shape or a compensated equi-angular shape;
a camera including an active-pixel image sensor for capturing at least a portion of the image reflected by the mirror; and
means for mapping pixel data of the at least a portion of the image captured by the camera into a viewable image.

38. The system of claim 37, wherein the mirror has a compensated equi-angular shape described by the equation:

$$\frac{dr}{d\left(\theta + \frac{A}{\alpha}\right)} = r\cot\left(k\tan\left(\theta + \frac{A}{\alpha}\right) + \frac{\pi}{2}\right)$$

where θ is the angle that a light ray makes with the axis as it reflects off of a point on the surface of the mirror and into the lens of the camera, r is the length of a light ray between the lens of the camera and the point on the surface of the mirror, α is a constant defining the gain, and k is a constant defined by (−1−α)/2.

39. The system of claim 37, wherein the camera is positioned so that an image sensor of the camera is substantially aligned with the axis.

40. The system of claim 37, wherein the means for mapping pixel data of the at least a portion of the image captured by the camera into a viewable image comprises:
   means for retrieving a source image file including the pixel data;
   a processor for creating a destination image file buffer, for mapping the pixel data of the captured image from the source image file to the destination image file buffer, and for outputting pixel data from the destination image file buffer as a destination image file; and
   means for displaying a viewable image defined by the destination file.

41. The system of claim 40, wherein the processor further serves as means for:
   defining a first set of coordinates of pixels in the destination image file;
   defining a second set of coordinates of pixels in the source image file;
   identifying coordinates of the second set that correspond to coordinates of the first set; and
   inserting pixel data for pixel locations corresponding to the second set of coordinates into pixel locations corresponding to the first set of coordinates.

42. The system of claim 40, wherein the viewable image is representative of the entire scene reflected by the mirror.

43. The system of claim 40, wherein the viewable image is representative of a portion of the scene reflected by the mirror.

44. The system of claim 43, further comprising means for choosing the portion of the scene to be displayed.

45. The system of claim 44, wherein the means for choosing the portion of the scene to be displayed is: a mouse, a keyboard, a joystick, a trackball, or a head tracker device.

46. The system of claim 37, wherein the means for mapping the pixel data of the at least a portion of the image captured by the camera into a viewable image comprises:
   means for receiving a source image including the pixel data;
   a processor for creating a texture map memory buffer, for transferring the pixel data from the source image to the texture map memory buffer, for producing a plurality of vertices for a model of a viewable image, wherein the vertices are representative of one or more points corresponding to one or more space vectors of the source image, and for computing one or more texture map coordinates for each of the vertices, wherein the one or more texture map coordinates are representative of one or more pieces of pixel data in the texture map memory buffer corresponding to one or more pieces of pixel data in the source image, and
   a graphics hardware device for receiving the model, including the vertices and the one or more texture map coordinates, for utilizing the pixel data to complete the model, and for displaying the completed model as a viewable image.

47. The system of claim 46, wherein the model comprises one of: a cube, a hexahedron, a sphere, an ellipsoid, a cylinder, an icosahedron, and an arbitrary three-dimensional model.

48. The system of claim 46, wherein the viewable image is representative of the entire scene reflected by the mirror.

49. The system of claim 46, wherein the viewable image is representative of a portion of the scene reflected by the mirror.

50. The system of claim 49, further comprising means for choosing the portion of the scene to be displayed.

51. The system of claim 50, wherein the means for choosing the portion of the scene to be displayed is: a mouse, a keyboard, a joystick, a trackball, or a head tracker device.

52. The system of claim 37, further comprising a target apparatus attached to the mirror.

53. The system of claim 37, further comprising:
   means for transmitting the pixel data of the at least a portion of the captured image to a server computer; and
   means for processing the pixel data of the at least a portion of the captured image on the server computer to obtain the viewable image.

54. A method of processing images, the method comprising the steps of:
   providing a mirror for reflecting an image of a scene;
   mounting the mirror on an axis, wherein the mirror includes a convex reflective surface defined by rotating around the axis: an equi-angular shape or a compensated equi-angular shape;
   capturing the image reflected by the mirror with a first camera;
   capturing a portion of the scene with at least one secondary camera;
   mapping pixel data of the image captured by the first camera into a viewable image; and
   displaying cooperatively the viewable image and the portion of the scene captured by the at least one secondary camera.

55. The method of claim 54, further comprising the step of panning, tilting or zooming the at least one secondary camera.

56. The method of claim 54, further comprising the step of positioning the at least one secondary camera: above the mirror, below the mirror, adjacent to the mirror, or adjacent to the first camera.

57. The method of claim 56, further comprising the step of moveably positioning the at least one secondary camera at a plurality of locations adjacent to the mirror.

58. The method of claim 56, further comprising the step of moveably positioning the at least one secondary camera at a plurality of locations adjacent to the first camera.

59. The method of claim 54, further comprising the step of capturing a portion of the image of the scene reflected by the mirror with the at least one secondary camera.

60. The method of claim 59, further comprising the step of mapping pixel data of the portion of the image of the scene captured by the at least one secondary camera into a viewable image.

61. The method of claim 54, wherein the step of mapping the pixel data of the image captured by the first camera into a viewable image comprises:
   retrieving a source image file including the pixel data;
   creating a destination image file buffer;
   mapping the pixel data of the captured image from the source image file to the destination image file buffer;
   outputting pixel data from the destination image file buffer as a destination image file; and
   displaying a viewable image defined by the destination file.

62. The method of claim 61, wherein the step of mapping the pixel data from the source image file to the destination image file buffer comprises the steps of:

defining a first set of coordinates of pixels in the destination image file;

defining a second set of coordinates of pixels in the source image file;

identifying coordinates of the second set that correspond to coordinates of the first set; and inserting pixel data for pixel locations corresponding to the second set of coordinates into pixel locations corresponding to the first set of coordinates.

63. The method of claim 54, wherein the step of mapping the pixel data of the image captured by the first camera into a viewable image comprises:

retrieving a source image including pixel data;

creating a first texture map memory buffer;

transferring the pixel data from the source image to the first texture map memory buffer;

producing a plurality of vertices for a first model of a viewable image, wherein the vertices are representative of one or more points corresponding to one or more space vectors of the source image;

computing one or more texture map coordinates for each of the vertices, wherein the one or more texture map coordinates are representative of one or more pieces of pixel data in the first texture map memory buffer corresponding to one or more pieces of pixel data in the source image;

transferring the first model, including the vertices and the one or more texture map coordinates, to a graphics hardware device; and instructing the graphics hardware device to use the pixel data to complete the first model and display the completed model as a viewable panoramic image.

64. The method of claim 63, wherein the steps may be performed sequentially.

65. The method of claim 63, wherein one or more of the steps may be performed simultaneously.

66. The method of claim 63, wherein one or more of the steps may be repeated to sequentially display a plurality of viewable images, and wherein the plurality of viewable images may be displayed at a video frequency rate.

67. The method of claim 63, wherein the step of producing the plurality of vertices for a first model of a viewable image is executed once; the step of computing one or more texture map coordinates for each of the vertices is executed once; and the step of transferring the first model is executed once, further comprising the steps of:

updating the pixel data in the first texture map memory buffer;

instructing the graphics hardware device to use the updated pixel data to complete the first model and to display the completed model as a viewable image; and repeating the updating the pixel data in the first texture map memory buffer step and the instructing the graphics hardware device to use the updated pixel data to complete the first model and to display the completed model as a viewable image step so as to sequentially display a plurality of viewable images, wherein the plurality of viewable images may be displayed at a video frequency rate.

68. The method of claim 54, wherein the step of displaying cooperatively the viewable image and the portion of the scene captured by the at least one secondary camera comprises:

displaying the image of the scene reflected by the mirror as a viewable image;

overlaying the portion of the scene captured by the at least one secondary camera onto a corresponding portion of the viewable image; and displaying the viewable image and the overlayed portion of the scene.

69. The method of claim 68, further comprising the step of:

registering the pixel data of the image of the scene reflected by the mirror with pixel data of the corresponding portion of the scene captured by the at least one secondary camera.

70. The method of claim 68, further comprising the step of:

blending border pixel data of the overlayed portion of the scene with the pixel data of the image captured by the first camera.

71. The method of claim 54, further comprising the step of:

choosing the portion of the scene to be captured by the at least one secondary camera.

72. The method of claim 54, further comprising the steps of:

transmitting the pixel data of the scene reflected by the mirror to a server computer;

transmitting pixel data of the portion of the scene captured by the at least one secondary camera to a server computer;

processing the pixel data of the scene reflected by the mirror on the server computer to display a viewable image; and overlaying the portion of the scene captured by the at least one secondary camera onto the corresponding portion of the viewable image on the server computer to display the viewable image and the overlayed portion of the scene.

73. A method for processing images, the method comprising the steps of:

providing a mirror for reflecting an image of a scene;

mounting the mirror on an axis;

capturing the image reflected by the mirror with a first camera;

moveably positioning at least one secondary camera at a plurality of locations adjacent to the mirror or the first camera;

capturing a portion of the image reflected by the mirror with the at least one secondary camera;

mapping pixel data of the image captured by the first camera into a viewable image; and displaying cooperatively the viewable image and the portion of the image captured by the at least one secondary camera.

74. The method of claim 73, wherein the mirror includes a convex reflective surface defined by rotating around the axis: an equi-angular shape, a compensated equi-angular shape, a parabolic shape, a hyperbolic shape, or a spherical shape.

75. The method of claim 73, further comprising the step of panning, tilting or zooming the at least one secondary camera.

76. The method of claim 73, wherein the step of mapping the pixel data of the image captured by the first camera into a viewable image comprises:

retrieving a source image file including the pixel data;

creating a destination image file buffer;

mapping the pixel data of the captured image from the source image file to the destination image file buffer;

outputting pixel data from the destination image file buffer as a destination image file; and displaying a viewable image defined by the destination file.

77. The method of claim 76, wherein the step of mapping the pixel data from the source image file to the destination image file buffer comprises the steps of:

defining a first set of coordinates of pixels in the destination image file;

defining a second set of coordinates of pixels in the source image file;

identifying coordinates of the second set that correspond to coordinates of the first set; and inserting pixel data for pixel locations corresponding to the second set of coordinates into pixel locations corresponding to the first set of coordinates.

78. The method of claim 73, wherein the step of mapping the pixel data of the image captured by the first camera into a viewable image comprises:

retrieving a source image including pixel data;

creating a first texture map memory buffer;

transferring the pixel data from the source image to the first texture map memory buffer;

producing a plurality of vertices for a first model of a viewable image, wherein the vertices are representative of one or more points corresponding to one or more space vectors of the source image;

computing one or more texture map coordinates for each of the vertices, wherein the one or more texture map coordinates are representative of one or more pieces of pixel data in the first texture map memory buffer corresponding to one or more pieces of pixel data in the source image;

transferring the first model, including the vertices and the one or more texture map coordinates, to a graphics hardware device; and instructing the graphics hardware device to use the pixel data to complete the first model and display the completed model as a viewable panoramic image.

79. The method of claim 78, wherein the steps may be performed sequentially.

80. The method of claim 78, wherein one or more of the steps may be performed simultaneously.

81. The method of claim 78, wherein one or more of the steps may be repeated to sequentially display a plurality of viewable images, and wherein the plurality of viewable images may be displayed at a video frequency rate.

82. The method of claim 78, wherein the step of producing the plurality of vertices for a first model of a viewable image is executed once; the step of computing one or more texture map coordinates for each of the vertices is executed once; and the step of transferring the first model is executed once, further comprising the steps of:

updating the pixel data in the first texture map memory buffer;

instructing the graphics hardware device to use the updated pixel data to complete the first model and to display the completed model as a viewable image; and repeating the updating the pixel data in the first texture map memory buffer step and the instructing the graphics hardware device to use the updated pixel data to complete the first model and to display the completed model as a viewable image step so as to sequentially display a plurality of viewable images, wherein the plurality of viewable images may be displayed at a video frequency rate.

83. The method of claim 73, wherein the step of displaying cooperatively the viewable image and the portion of the image captured by the at least one secondary camera comprises:

displaying the image of the scene reflected by the mirror as a viewable image;

mapping pixel data of the portion of the image captured by the at least one secondary camera into a viewable portion of the image;

overlaying the viewable portion of the image captured by the at least one secondary camera onto a corresponding portion of the viewable image; and displaying the viewable image and the overlayed viewable portion of the image.

84. The method of claim 83, further comprising the step of:

registering the pixel data of the image of the scene reflected by the mirror with pixel data of the corresponding portion of the image captured by the at least one secondary camera.

85. The method of claim 83, further comprising the step of:

blending border pixel data of the overlayed viewable portion of the image of the scene with the pixel data of the image captured by the first camera.

86. The method of claim 73, further comprising the step of:

choosing the portion of the image of the scene to be captured by the at least one secondary camera.

87. The method of claim 83, further comprising the steps of:

transmitting the pixel data of the scene reflected by the mirror to a server computer;

transmitting pixel data of the portion of the image of the scene captured by the at least one secondary camera to a server computer;

processing the pixel data of the scene reflected by the mirror on the server computer to display a viewable image;

processing the pixel data of the portion of the image of the scene captured by the at least one secondary camera on the server computer into a viewable portion of the image; and overlaying the viewable portion of the image of the scene captured by the at least one secondary camera onto the corresponding portion of the viewable image on the server computer to display the viewable image and the overlayed portion of the viewable image of the scene.

88. A method for processing images, the method comprising the steps of:

providing a mirror for reflecting an image of a scene;

mounting the mirror on an axis, wherein the mirror includes a convex reflective surface defined by rotating around the axis: an equi-angular shape or a compensated equi-angular shape;

capturing at least a portion of the image reflected by the mirror with a camera including an active-pixel image sensor; and mapping pixel data of the at least a portion of the image captured by the camera into a viewable image.

89. The method of claim 88, wherein the step of mapping pixel data of the at least a portion of the image captured by the camera into a viewable image comprises:

retrieving a source image file including the pixel data;

creating a destination image file buffer;
mapping the pixel data of the captured image from the source image file to the destination image file buffer;
outputting pixel data from the destination image file buffer as a destination image file; and
displaying a viewable image defined by the destination file.

90. The method of claim 88, wherein the step of mapping the pixel data from the source image file to the destination image file buffer comprises the steps of:
defining a first set of coordinates of pixels in the destination image file;
defining a second set of coordinates of pixels in the source image file;
identifying coordinates of the second set that correspond to coordinates of the first set; and
inserting pixel data for pixel locations corresponding to the second set of coordinates into pixel locations corresponding to the first set of coordinates.

91. The method of claim 88, wherein the step of mapping the pixel data of the at least a portion of the image captured by the camera into a viewable image comprises:
retrieving a source image including pixel data;
creating a first texture map memory buffer;
transferring the pixel data from the source image to the first texture map memory buffer;
producing a plurality of vertices for a first model of a viewable image, wherein the vertices are representative of one or more points corresponding to one or more space vectors of the source image;
computing one or more texture map coordinates for each of the vertices, wherein the one or more texture map coordinates are representative of one or more pieces of pixel data in the first texture map memory buffer corresponding to one or more pieces of pixel data in the source image;
transferring the first model, including the vertices and the one or more texture map coordinates, to a graphics hardware device; and
instructing the graphics hardware device to use the pixel data to complete the first model and display the completed model as a viewable panoramic image.

92. The method of claim 91, wherein the steps may be performed sequentially.

93. The method of claim 91, wherein one or more of the steps may be performed simultaneously.

94. The method of claim 91, wherein one or more of the steps may be repeated to sequentially display a plurality of viewable images, and wherein the plurality of viewable images may be displayed at a video frequency rate.

95. The method of claim 91, wherein the step of producing the plurality of vertices for a first model of a viewable image is executed once; the step of computing one or more texture map coordinates for each of the vertices is executed once; and the step of transferring the first model is executed once, further comprising the steps of:
updating the pixel data in the first texture map memory buffer;
instructing the graphics hardware device to use the updated pixel data to complete the first model and to display the completed model as a viewable image; and
repeating the updating the pixel data in the first texture map memory buffer step and the instructing the graphics hardware device to use the updated pixel data to complete the first model and to display the completed model as a viewable image step so as to sequentially display a plurality of viewable images, wherein the plurality of viewable images may be displayed at a video frequency rate.

96. The method of claim 88, further comprising the step of:
choosing the portion of the image to be displayed.

97. The method of claim 88, further comprising the steps of:
transmitting the pixel data of the at least a portion of the captured image to a server computer; and
processing the pixel data of the at least a portion of the captured image on the server computer to obtain the viewable image.

* * * * *